US009531582B2

(12) United States Patent
Wade et al.

(10) Patent No.: US 9,531,582 B2
(45) Date of Patent: Dec. 27, 2016

(54) MOBILE DATA TRIANGULATION SYSTEM AND METHOD FOR INDEXING, ACCESSING AND ROUTING NETWORK RESOURCES

(71) Applicant: Ekkoo Registry, LLC, Aptos, CA (US)

(72) Inventors: Thomas Wade, Aptos, CA (US); Walter Blackwell, Bethesda, MD (US)

(73) Assignee: EKKOO REGISTRY, LLC, Aptos, CA (US)

(*) Notice: Subject to any disclaimer, the term of this patent is extended or adjusted under 35 U.S.C. 154(b) by 171 days.

(21) Appl. No.: 14/204,177

(22) Filed: Mar. 11, 2014

(65) Prior Publication Data

US 2014/0280971 A1    Sep. 18, 2014

Related U.S. Application Data

(60) Provisional application No. 61/777,416, filed on Mar. 12, 2013.

(51) Int. Cl.
 G06F 15/173   (2006.01)
 H04L 12/24    (2006.01)
 H04L 12/911   (2013.01)

(52) U.S. Cl.
 CPC .......... *H04L 41/0233* (2013.01); *H04L 47/70* (2013.01)

(58) Field of Classification Search
 CPC .................. H04L 47/70; H04L 41/0233
 USPC ........................................... 709/226
 See application file for complete search history.

(56) References Cited

U.S. PATENT DOCUMENTS

| | | | | |
|---|---|---|---|---|
| 2009/0258634 | A1* | 10/2009 | Amine | H04L 29/1216 455/413 |
| 2013/0282486 | A1* | 10/2013 | Rahle | G06F 3/048 705/14.53 |
| 2013/0282504 | A1* | 10/2013 | Lessin | G06Q 30/02 705/26.1 |
| 2014/0052539 | A1* | 2/2014 | Lauback | G06Q 30/0255 705/14.66 |

* cited by examiner

*Primary Examiner* — Joseph Greene
(74) *Attorney, Agent, or Firm* — Greenblum & Bernstein, P.L.C.

(57) ABSTRACT

A computer network-resource management system and method are provided that use mobile and deployed devices to capture and transmit an event for instant conversion into an instrument by which to pursue the actionable or acquirable element of the event. Mobile phones and other network devices supply the resource management system the "triangulatable" data necessary for it to allocate, personalize, and activate network resources in support of evolutionary needs. Evolutionary needs are often subject to changing states, some of which dynamically transition from simple to complex states.

33 Claims, 20 Drawing Sheets

MOBILE DATA TRIANGULATION SYSTEM AND METHOD FOR INDEXING, ACCESSING AND ROUTING NETWORK RESOURCES

CLAIM FOR PRIORITY

This application claims the benefit of priority to U.S. Provisional Application No. 61/777,416, filed Mar. 12, 2013, the entire contents of which are hereby incorporated by reference.

BACKGROUND

1. Field of the Disclosure

The present disclosure generally relates to a software-based computer network-resource management platform that uses mobile phones and other network devices to capture and transmit event-defining data for instant conversion into an instrument by which to pursue the actionable or acquirable element of the event.

2. Background Information

As a platform, the tandem of smartphones and mobile apps provide a solution to many of the situations people encounter during the day. But limited by their structure and functionality, there is a far greater number of things for which they cannot provide a solution. With an ever-growing number of people looking to their mobile devices for solutions to the demands of day, the limitations of mobile apps represents a problem. Moreover, it's unlikely that the app paradigm can be expanded to solve the problem—requiring the emergence of a new mobile platform that is situationally-aware and proactive in its support for ongoing user designated endeavors.

Evermore, people's ambitions and actions are echoed by network activity. Except as a link to resources, the networks themselves are not proactive in their support of these endeavors. They don't determine the most efficient course of action nor do they proactively orchestrate the timely availability of resources in its support or alteration.

SUMMARY OF THE DISCLOSURE

The present disclosure, through one or more of its various aspects, embodiments, and/or specific features or sub-components, provides various systems. servers, methods, media, and programs for interfacing compiled codes, such as, for example, JavaScript scripts.

The disclosure relates to a software-based computer network-resource management platform that uses mobile phones and other network devices to capture and transmit an event for instant conversion into an instrument by which to pursue the actionable or acquirable element of the event. The vectoring engine-generating platform has sixteen major components: (A) Capture and Transmit Framework; (B) Transmission Processing; (C) Object Generator; (D) Actualizer; (E) Resource Vectoring Engine Framework (F) Traffic Recorder; (G) User Virtualization Framework; (H) Engine Manager/Player Framework; (I) Listening Post Framework; (J) Event Registration Framework; (K) Financial Framework; (L) Box Library; (M) Code Library: (N) Service Module Library; (O) Graphic User Interface Library; (P) Service Module Framework. In addition to these, the platform relies on nine major elements: (1) Resource Vectoring Engine; (2) Service Modules; (3) Live Objects; (4) Primal Objects; (5) Stamps, Codes & Indexes; (6) Plates; (7) Lockets; (8) Boxes; (9) Interfaces. Altogether, the components and elements are designed to synchronize the performance and delivery of network accessible resources throughout the pursuit of the actionable or acquirable element of an originating event.

The resource management system will create a platform that will offer a new way of setting and executing a course of action. It will enable the emergence of new ways of supporting people's endeavors; enabling its networks to proactively support the continuation of an activity or the responses to an event, from their beginnings.

In one embodiment, there is a system for managing computer network resources, including a transmission element to process data acquired from an external source; an object generator to compile the data acquired from the transmission element into a live object; an actualizer to link the resources identified in the live object via service modules and interfaces; and a vectoring engine to implement the objectives a the live object and an active plate and manage the service modules and interfaces of the system to execute the objectives.

In another embodiment, there is a computer-implemented method of managing computer network resources, including at least one processor including processing data acquired from an external source; compiling the data acquired from the external source into a live object; linking the resources identified in the live object via service modules and interfaces; and implementing the objectives of the live object and an active plate and managing the service modules and interfaces of the system to execute the objectives.

In still another embodiment, there is a computer readable storage device that stores a set of instructions for managing computer network resources, the instructions when executed causing a computer to perform operations including processing data acquired from an external source; compiling the data acquired from the external source into a live object; linking the resources identified in the live object via service modules and interfaces; and implementing objectives of the live object and an active plate and managing the service modules and interfaces of the system to execute the objectives.

In one aspect, wherein the transmission element validates the data acquired from the external source; extracts at least a portion of the data and inserts identifiers system codes and indexes; and aggregates the at least a portion of the data, the system codes and the indexes and forwards the aggregated information to the object generator.

In another aspect, the object generator assembles the aggregated data acquired from the transmission element by: scanning the aggregated data for embedded algorithms, inserting additional identifiers, system codes and indexes received from at least one of user and event registration data, and formatting the aggregated data based on the embedded algorithms; codes the aggregated data by inserting header codes and indexes received from library sources; and creates the live object and the active plate from the aggregated data.

In yet another aspect, the actualizer provides an instance of a vectoring engine by using data in the live object to provide support in a continuously evolving manner; activates the link acquire information from the resources and to personalize performance of the resources, and interfaces with internal and external resources.

In still another aspect, the vectoring engine implements the objectives using: the active and a reserved plate defining instructions and resource designations corresponding to a stage of implementation; user data providing a user data profile to personalize performance of the system; user resources designating the resources enabled on a user or system device; a communications manager interlacing active system components; and a controller extracting and posting the codes included in the live object for use by the active system components, wherein the vectoring engine executes the instructions and resource designations included in the live object and the active plate.

In another aspect, the live object and the active plate include updatable code-based instructions that govern performance of an instance of the vectoring engine.

In yet another aspect, the instance of the vectoring engine coordinates performance of available system resources in furtherance of the objectives.

In still another aspect, the service modules are dynamically managed in an evolving manner.

In yet one other aspect, the external source is at least one of a mobile and a network device, including plug-ins, to capture and transmit markers the system uses to initiate management of system resources.

In yet another aspect, the external source is a listening post to facilitate the capture, transmission and integration of external performance altering data into the live objects, and communicate with the actualizer.

In an aspect, the user data profile includes at least at least one of the user's language, mobile number(s), time zone, device ID's. use history. calendar, personal codes, personal networks, active boxes, active interfaces, vectoring engines, and onboard service modules.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

The present disclosure, through one or more of its various aspects, embodiments and/or specific features or sub-components, is thus intended to bring out one or more of the advantages as specifically noted below.

Figure 1:
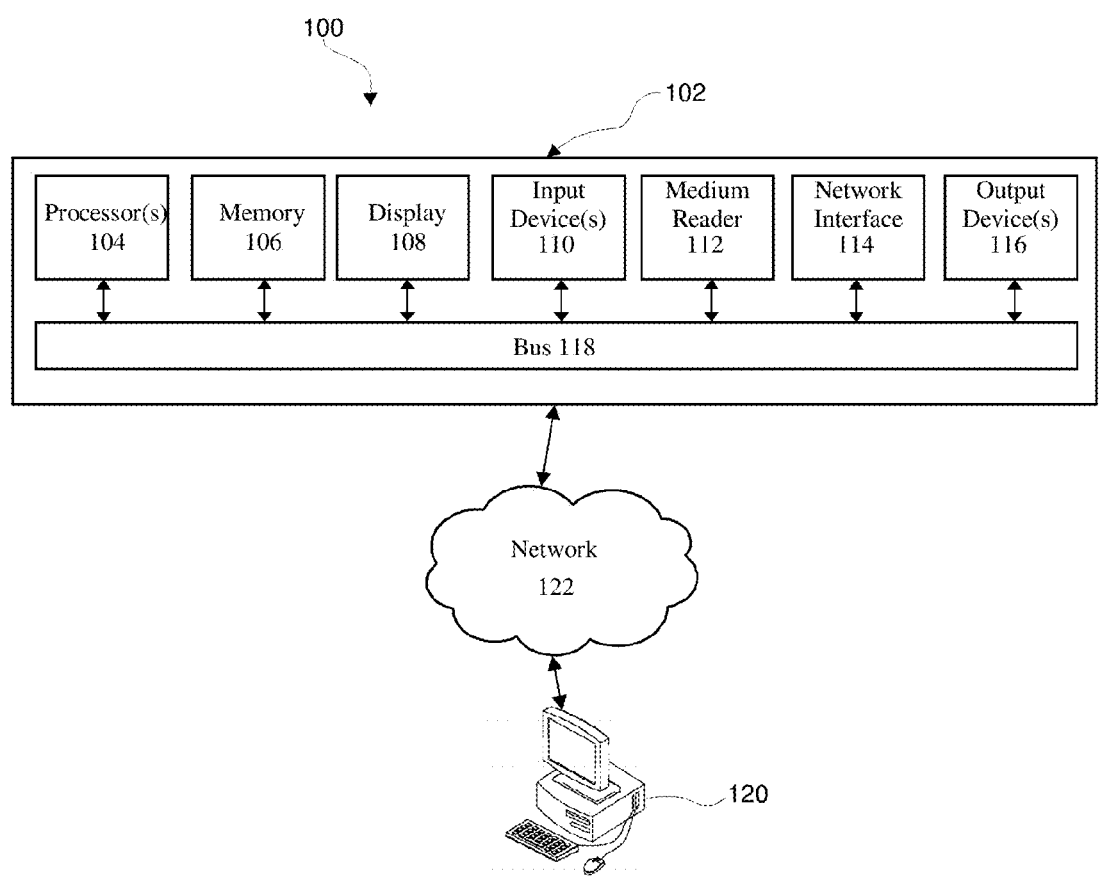
FIG. 1 is an exemplary system for use in accordance with one embodiment of the disclosure.

FIG. 1 is an exemplary system for use in accordance with the embodiments described herein. The system 100 is generally shown and may include a computer system 102, which is generally indicated. The computer system 102 may operate as a standalone device or may be connected to other systems or peripheral devices. For example, the computer system 102 may include, or be included within, any one or more computers, servers, systems, communication networks or cloud environment.

The computer system 102 may operate in the capacity of a server in a network environment, or the in the capacity of a client user computer in the network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer system 102 is illustrated, addition embodiments may include any collection of systems or sub-systems that individually or jointly execute instructions or perform functions.

As illustrated in FIG. 1, the computer system 102 may include at least one processor 104, such as, for example, a central processing unit, a graphics processing unit, or both. The computer system 102 may also include a computer memory 106. The computer memory 106 may include a static memory, a dynamic memory, or both. The computer memory 106 may additionally or alternatively include a hard disk, random access memory, a cache, or any combination thereof. Of course. those skilled in the art appreciate that the computer memory 106 may comprise any combination of known memories or a single storage.

As shown in FIG. 1, the computer system 102 may include a computer display 108, such as a liquid crystal display, an organic light emitting diode, a flat panel display, a solid state display, a cathode ray tube, a plasma display. or any other known display.

The computer system 102 may include at least one computer input device 110, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 and a network interface 114. Furthermore, the computer system 102 may include any additional devices, components, parts, peripherals, hardware, software or any combination thereof which are commonly known and understood as being included with or within a computer system, such as, but not limited to, an output device 116. The output device 116 may be, but is not limited to. a speaker. an audio out, a video out, a remote control output, or any combination thereof.

Each of the components of the computer system 102 may be interconnected and communicate via a bus 118. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be. but is not limited to, a local area network, a wide area network, the Internet, a telephony network, or any other network commonly known and understood in the art. The network 122 is shown in FIG. 1 as a wireless network. However, those skilled in the art appreciate that the network 122 may also be a wired network.

The additional computer device 120 is shown in FIG. 1 as a personal computer. However, those skilled in the art appreciate that, in alternative embodiments of the present application, the device 120 may be a laptop computer, a tablet PC, a personal digital assistant, a mobile device, a palmtop computer, a desktop computer, a communications device, a wireless telephone, a personal trusted device, a web appliance, a television with one or more processors embedded therein and/or coupled thereto, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

Described in detail below is a network-accessible, resource management system that manages the timely availability of information, communication, and algorithmic resources relevant to a user's activity. Such activities are deemed to have a starting point that can be detected by the system using an initial signaling transmission. As explained below, the system also uses subsequent signaling transmissions as a means to modify the performance of the controlling agents it creates.

Upon receipt of the transmission, which includes a set of identifies and codes that identify the user and the respective event, the data is extracted and combined with data already residing in the system as the basis for the creation of a unique instance of a controlling agent, referred to herein as a resource vectoring engine, that will manage the ongoing, timely availability of the resources necessary to accomplish the endeavor. The system is self-contained in that it not only vectoring engines, but also provides the local (cloud-based) and remote (user device-based) software environment they run in.

With reference to the following components and elements, an instance of a vectoring engine is created having a performance that echoes the intent of its originating transmission, as described below. For example, if the user was interested in purchasing a used car that was for sale by its owner (and its owner has completed the registration process) the vectoring engine created for that event would provide resources fitting to the user's pursuit and acquisition of the subject vehicle.

Figure 2:
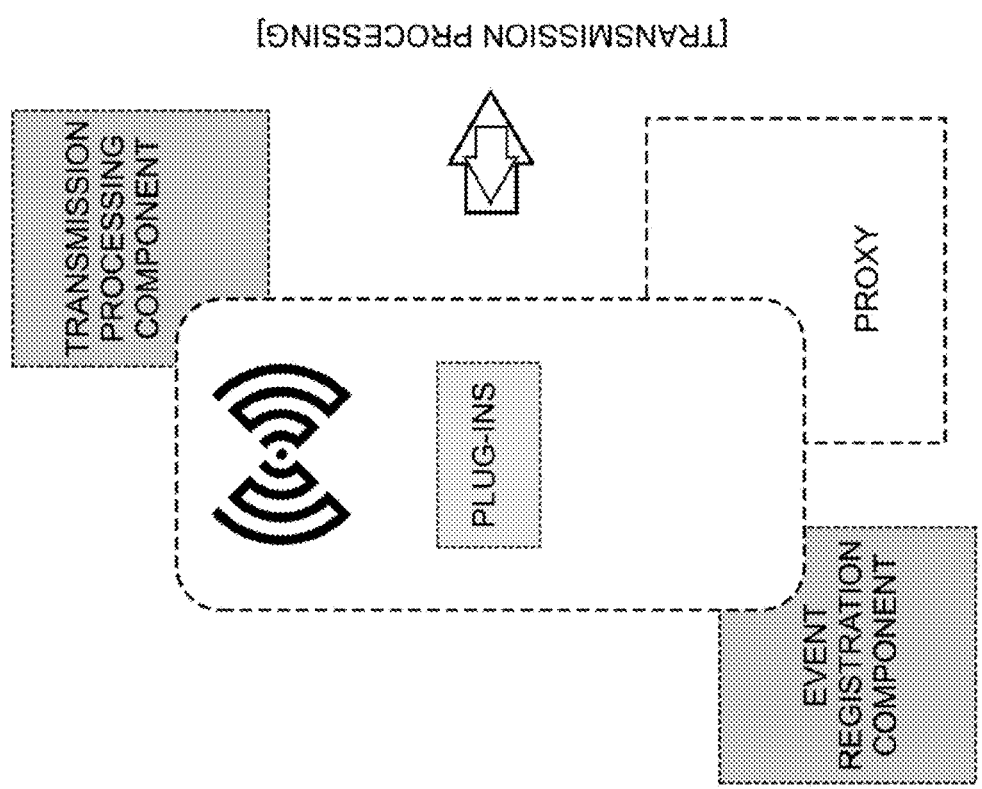
FIG. 2 discloses an exemplary capture and transmit framework in accordance with one embodiment of the disclosure.

FIG. 2 discloses an exemplary capture and transmit framework in accordance with one embodiment of the disclosure. The capture and transmit framework (component A) may be a software application that resides on the mobile devices or on the desktop devices (or any other device connected to the system) of the system's users. The software enables the transmission of the identifiers and codes the system users to identify the user and the respective "registered event" (see, component J). In its performance, the framework works in concert with system-compliant plug-ins. Individual plug-ins are respective to each mode of ingest; such as the entry of numbers, the scanning of a barcode, voice activation, GPS, etc. Upon receipt, and with the aid of the framework, they convert the mode of ingest into a format that is system-compliant. It is noted that plug-ins work in concert with a matching component B plug-in, Component A also includes the transmittable instruction codes that instruct the system to do such things as make it possible for user to "clone" and share a vectoring engine with another user. Further, the framework can support plug-ins that facilitates the attachment of notes and photographs. Additionally, the component can accept and display messages and interfaces communicated to it by component B (transmission processing) in response to a respective transmission. Moreover, the capture and transmit framework may also support the capture and transmission of the identifier by a third-party proxy.

Figure 3:
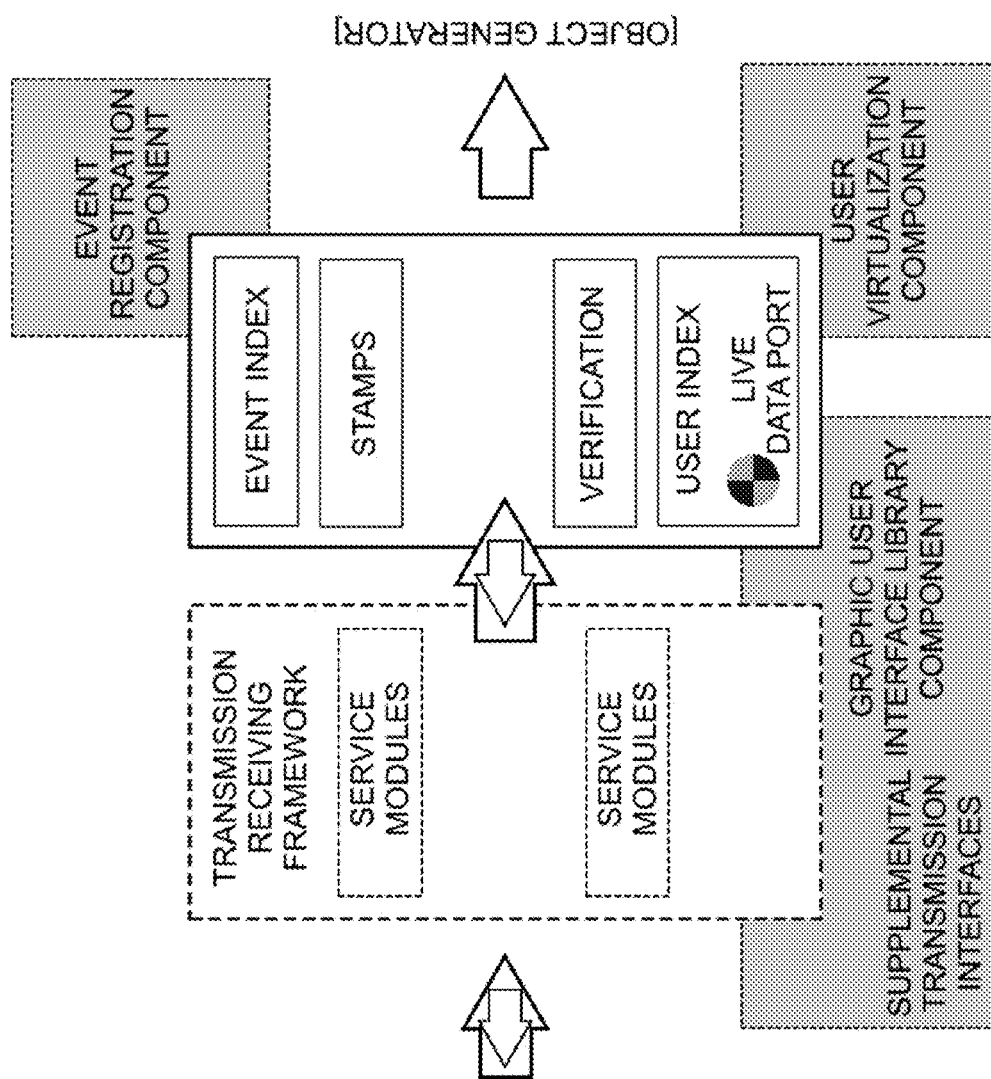
FIG. 3 discloses an exemplary transmission element in accordance with one embodiment of the disclosure.

FIG. 3 discloses an exemplary transmission element in accordance with one embodiment of the disclosure. The transmission element (component B) may be a an application, such as a local software application, that supports plug-ins. Together with the plug-ins component B receives, validates, formats, and incorporates data from other supporting components into the information received from component A. Component B is supported by the event registration component, the user virtualization framework component, and the graphic user interface library component, each of which is described in more detail below. In concert with these, component B carries out a number of processes to validate the transmission, extract data and coded instructions, inserts stamps. system codes and locators. Upon completion, the data, codes, locators, etc. are assembled, bundled or aggregated and forwarded to the object generator (component C). It is appreciated that although the data, etc. is described as assembled, bundled or aggregated, it is not limited to the described embodiment. Any method of transmitting the data may be used as readily understood in the art.

Figure 4:
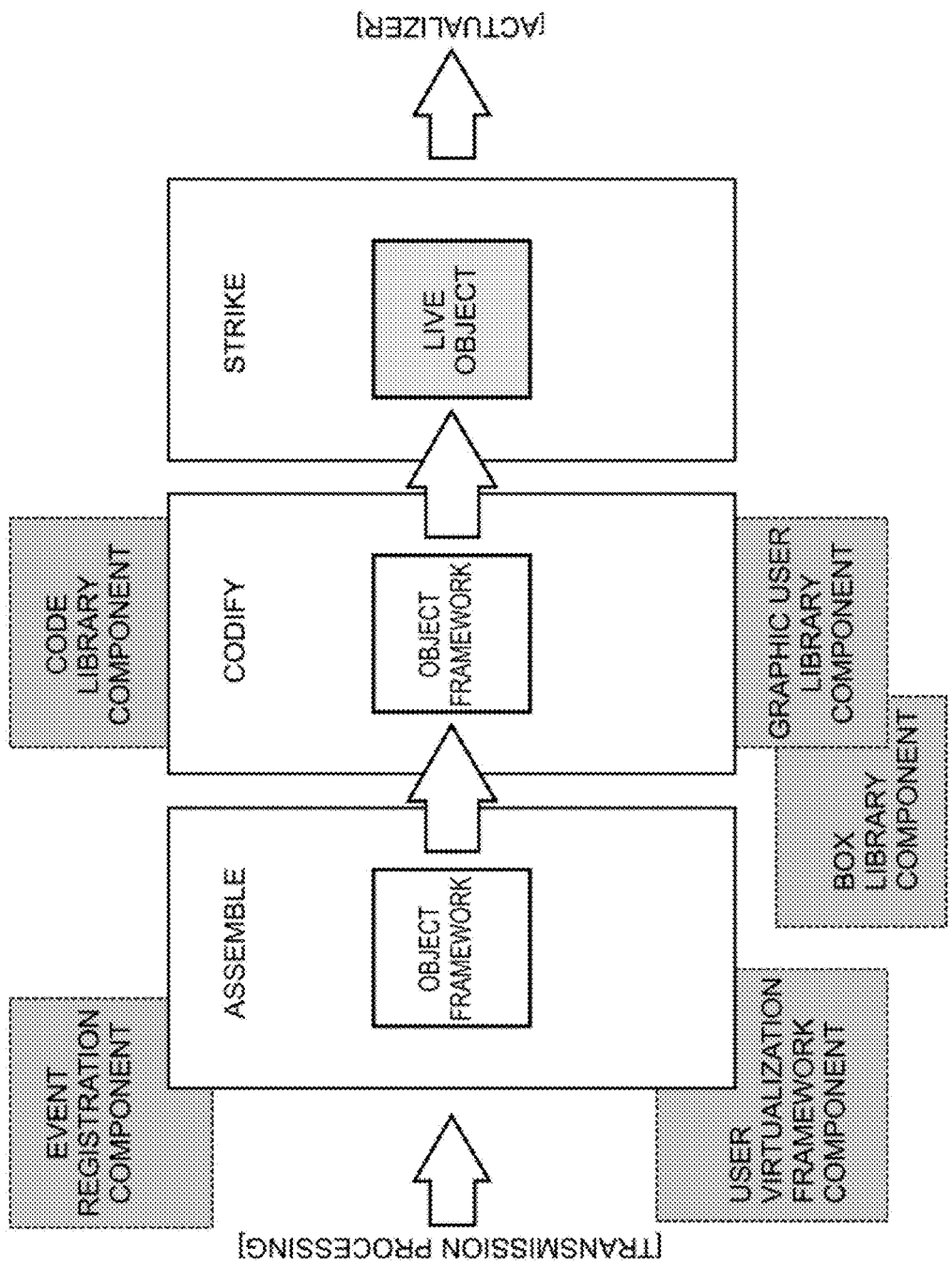
FIG. 4 discloses an exemplary object generator in accordance with one embodiment of the disclosure.

FIG. 4 discloses an exemplary object generator in accordance with one embodiment of the disclosure. The object generator (component C) may be an application, such as a local software application. Having three (3) phases, the components first phase (assemble) acquires the data aggregated by component B (transmission processing), scans its makeup, then based on the determinations of embedded algorithms, inserts additional codes/locators/identifiers it pulls from components G & J (user virtualization & event registration) then formats and transfers to the next stage (codify). Based on the determinations of embedded algorithms, the codify phase inserts header codes & locators found in components L, M and O (box library, code library, and graphic interface library). Upon completion, the aggregate is transferred to the third phase (strike). The algorithms of this phase evaluate the makeup of the "aggregate" and strikes (creates) one or more live objects. The determination of the number is based on instruction found in the originating transmission or in the user virtualization component or the event registration component. These instructions include the locators necessary to route them to their respective users or devices. Further, respective objects may have variations in the makeup of its data. Upon completing the striking process, the live object(s) is forwarded to component D (actualizer).

Figure 5:
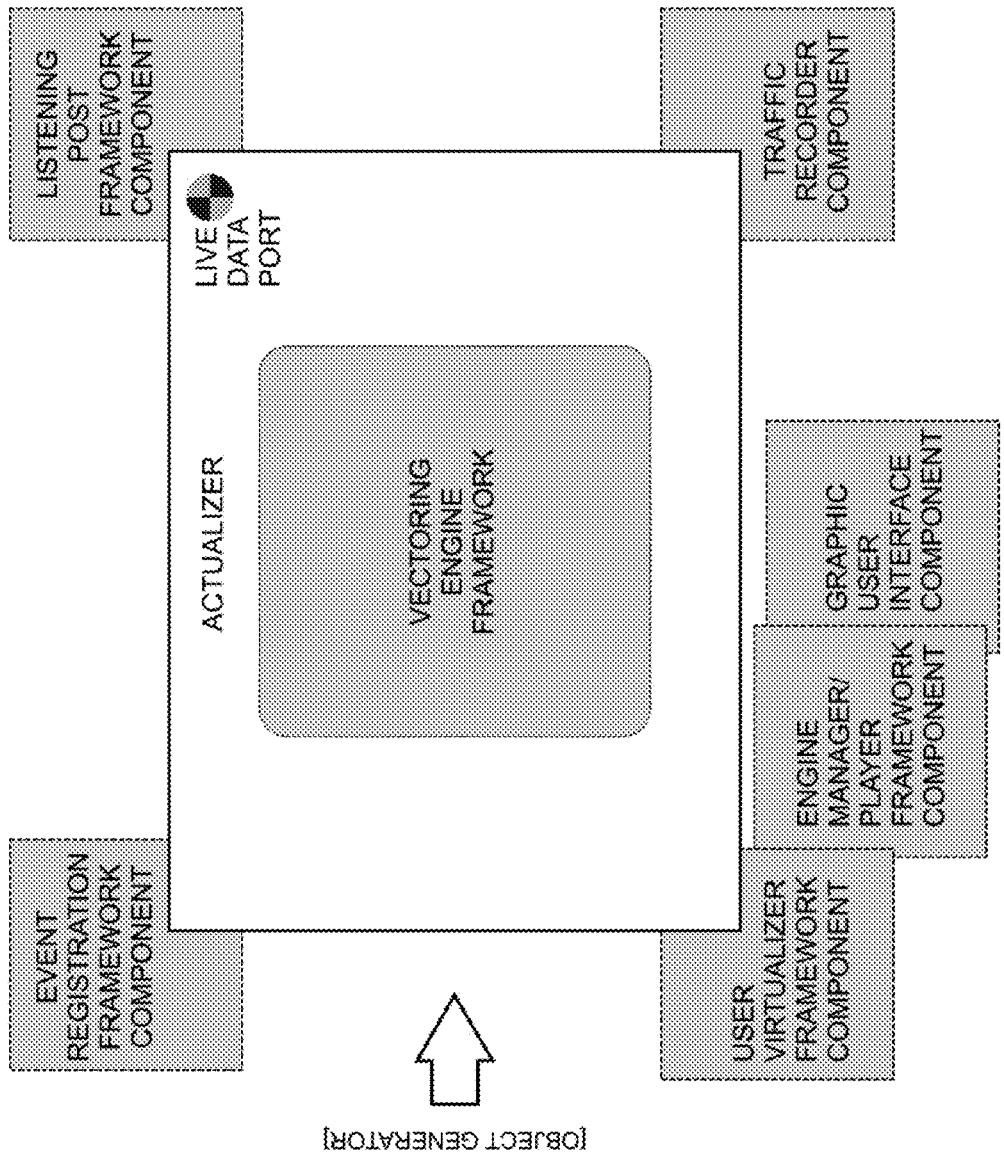
FIG. 5 discloses an exemplary actualizer in accordance with one embodiment of the disclosure.

FIG. 5 discloses an exemplary actualizer in accordance with one embodiment of the disclosure. The actualizer (component D) may be an application, such as a local software application, that uses the data found at a respective live object to "actualize" a unique instance of a vectoring engine framework. In this context, the term "actualize" means to provide support for a continuously evolving state. Its initial act is to activate links to the resources identified in the live object. This includes the transfer of the information necessary to personalize the performance of the resources. The second act is to activate the link to the user virtualization component (component G). The third act is to serve as a bus-like interface between an instance of a vectoring engine and the components denoted below. To function in this capacity, the actualizer manages the flow of information between an instance of a vectoring engine and other components and elements, specifically the event registration framework component, the listening post framework component, the user virtualization framework component, and the traffic reporter component, all described in more detail below. It is appreciated, however, that the actualizer is not limited to the steps noted above, and may include more or less steps as required.

Figure 6:
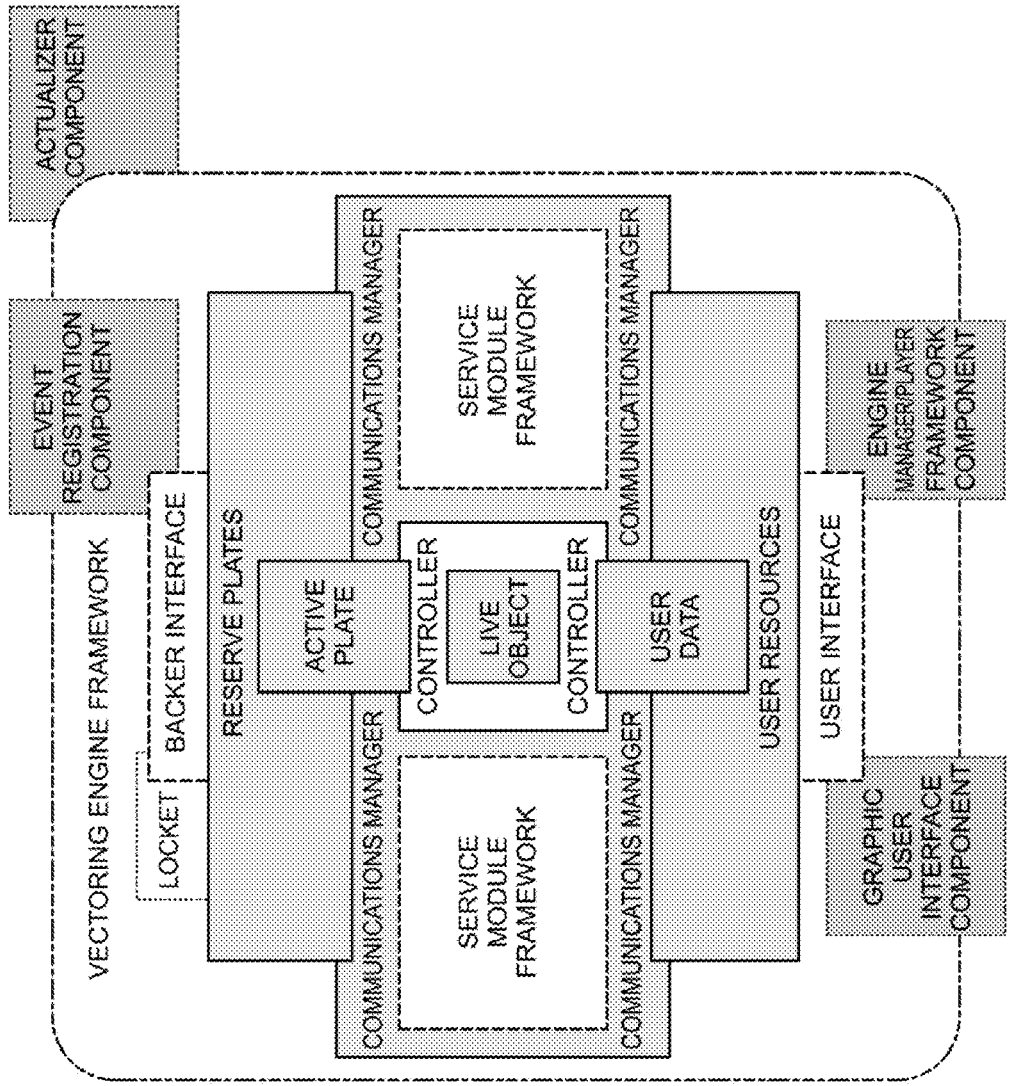
FIG. 6 discloses an exemplary vectoring engine framework in accordance with one embodiment of the disclosure.

FIG. 6 discloses an exemplary vectoring engine framework in accordance with one embodiment of the disclosure. The resource vectoring engine framework (component E) may be a software application, such as a hybrid (remote and local) software application that, together with the actualizer, creates a unique instance of a vectoring engine, which implements the objectives of the live object embedded therein and those of the current (active) plate. The resource vectoring engine may be, for example, a hybrid (remote and local) instanced software application that uses an embedded live object, the user's virtualization framework modules and backer supplied plates to dynamically manage the system's service modules to execute toward the desired goal. This component is supported by the actualizer component, the graphic user interface library component and backer app interfaces. These components include resources necessary to the performance of a vectoring engine and can be accessed both directly and indirectly by the vectoring engine as dictated by its state predefined progress. Boxes having dotted lines denote an off-board resource, component or element that both supports and is supported by a vectoring Engine. Active plate and reserve plates include the "backer" defined instructions and resource designations fitting to a particular stage of support the vectoring engine is providing. The active plate is the plate that is in current use, and reserve plates are not in active use. An instance of a plate exists both in the registration component and in the vectoring engine. User data is, for example, data extracted from the user data abstract included in the user virtualization component and designated (within a plate or a live object as necessary to the performance of the vectoring engine—for instance the language of the user. User resources denote a listing of plug-ins, media players, interfaces, boxes and other system resources that have been enabled on a device or in the user virtualization component. The communications manager acts as a bus-like interface between active (non-dotted line) components in the figure, whereas the controller component extracts and posts the codes included in a live object for use by the dependent components. It also receives progress report codes from these dependent components and writes them to the live object. A live object includes the updatable code-based instructions that along with the active plate govern the performance of an instance of a vectoring engine. A vectoring engine process flow can be instructed to operate in one of two modes—automatic initiation mode or manual initiation mode. Upon initiation, the controller sets about to execute the instructions included in the active plate and in reliance of the designated suite of resources.

Figure 7:
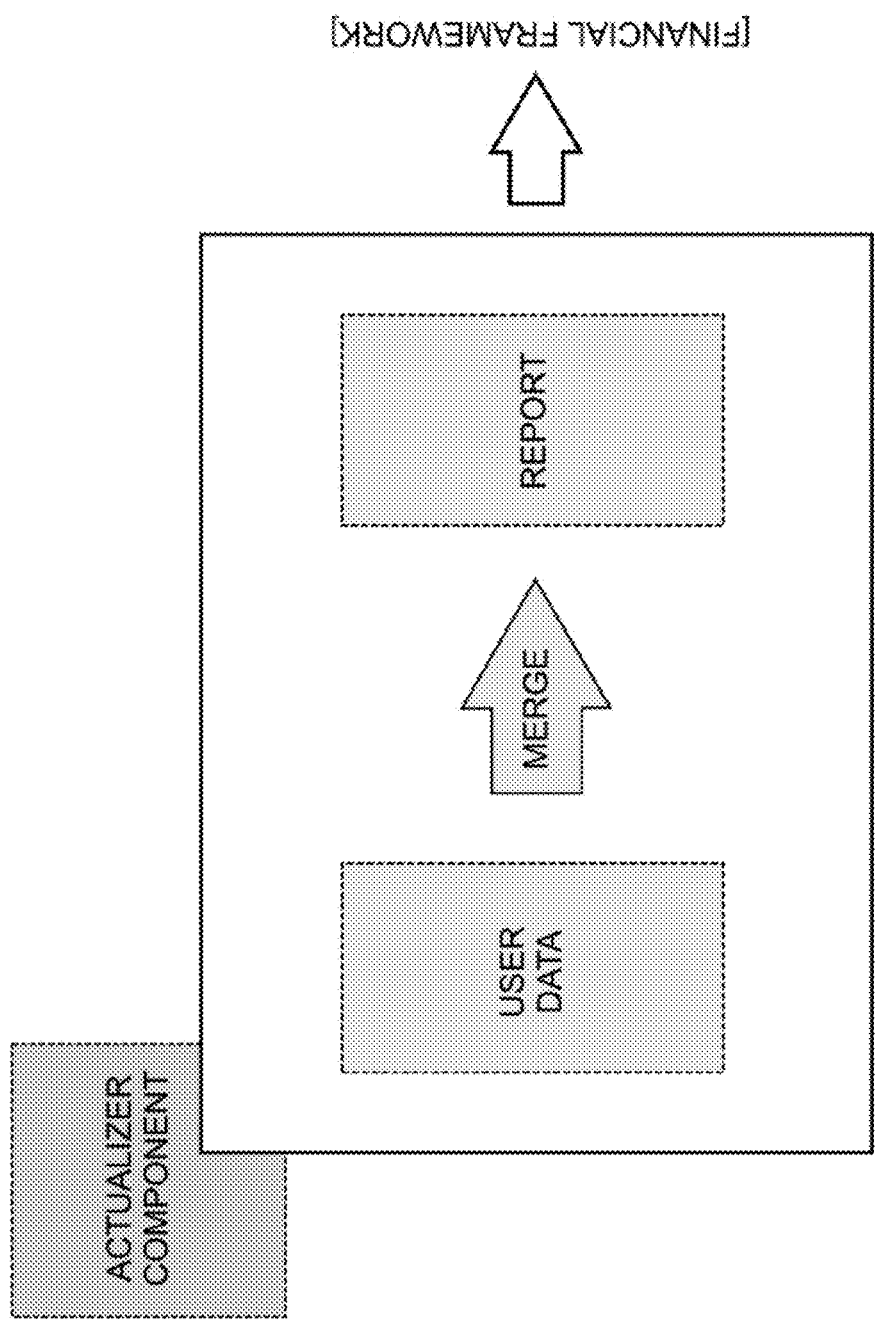
FIG. 7 discloses an exemplary traffic recorder in accordance with one embodiment of the disclosure.

FIG. 7 discloses an exemplary traffic recorder in accordance with one embodiment of the disclosure. The traffic recorder(component F) may be a software application, for example a local software application, that records and reports the instancing of vectoring engines and usage of each engine; merging the usage into a single report. The merging of data into a single report can be done using any technique understood to the skilled artisan. Moreover, the report is not limited to a single report, but may include one or more reports. Optionally, the report will be made available to the financial framework component, described below. The traffic recorder component is supported by the actualizer component and optionally by the financial framework component. The option may be invoked, for example, in conjunction with deployment of the system where a desire for monetization component exists.

Figure 8:
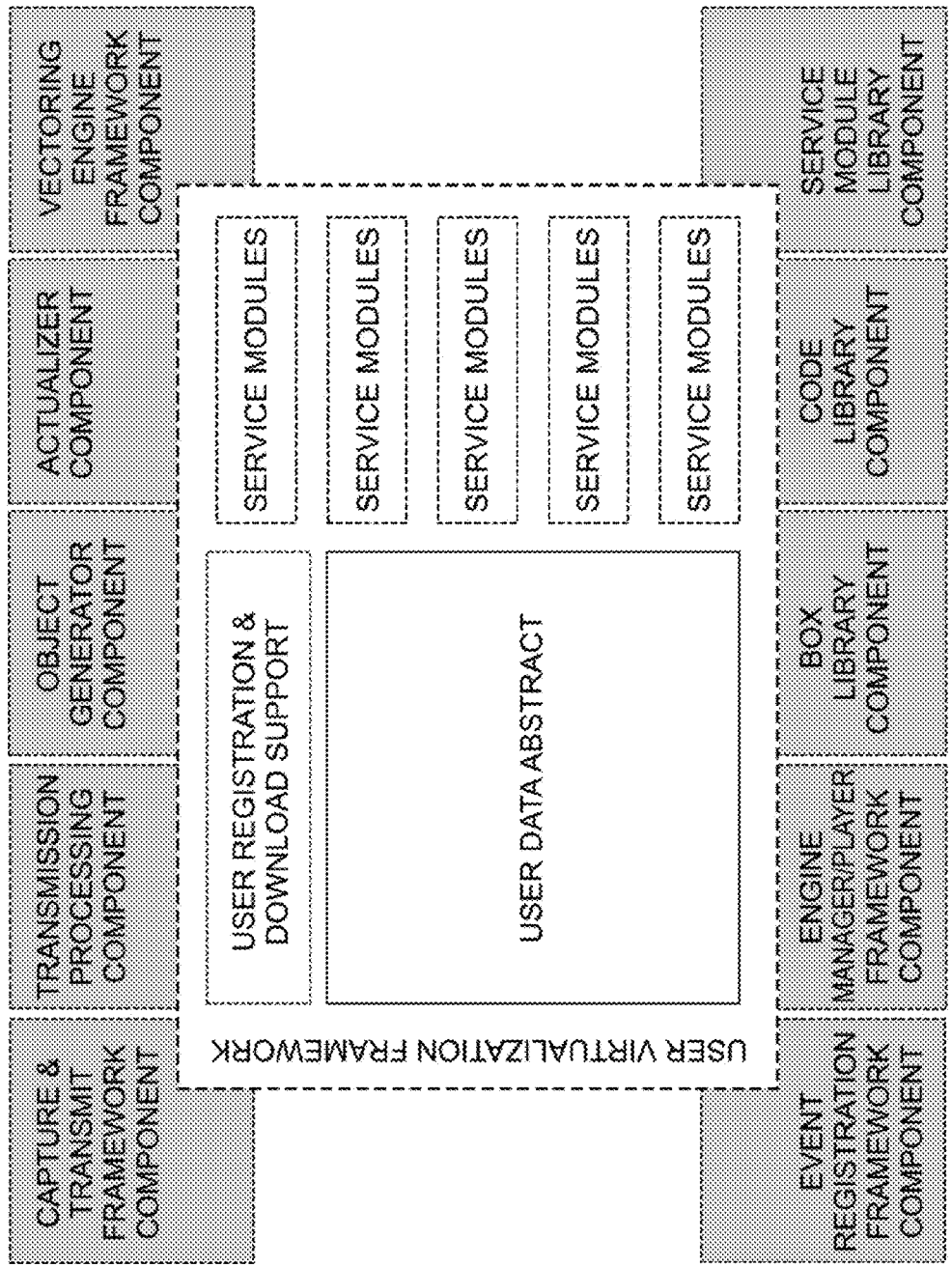
FIG. 8 discloses an exemplary user virtualization framework in accordance with one embodiment of the disclosure.

FIG. 8 discloses an exemplary user virtualization framework in accordance with one embodiment of the disclosure. The user virtualization framework (component G) may be a software application, such as a local software application, that includes components that support various user-centric interests. The user registration and download support component supports the new user registration process, which includes downloading the capture and transmit framework software and the engine manager/player framework software. The engine manager/player communications component manages communication between the user virtualization framework and the related user graphic framework. The service module library component includes a list of and links to onboard (remote/user downloaded) service modules. The user data abstract component includes the data profile the system uses to personalize the performance of the system and is without restriction as to type. Typical of its contents are the user's language, mobile number(s), time zone, device ID's, use history, calendar, personal codes, personal networks, active boxes, active interfaces. vectoring engines. onboard service modules. etc. Drawing from and adding to this data, are the following components: capture and transmit framework, transmission processing, object generator, actualizer, resource vectoring engine framework, event registration framework, engine manager/player framework, box library; code library, service module library, and the graphic user interface library.

Figure 9:
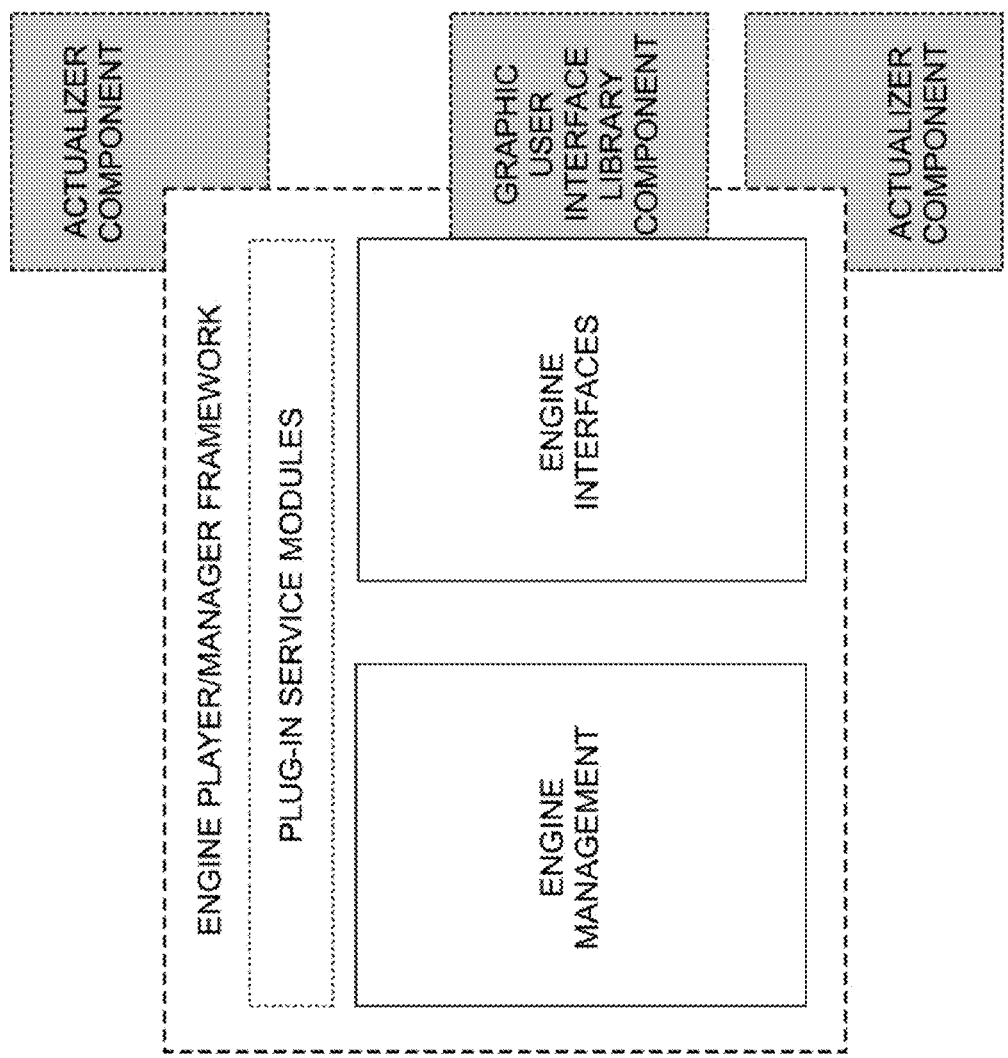
FIG. 9 discloses an exemplary engine manager/player framework in accordance with one embodiment of the disclosure.

FIG. 9 is an exemplary engine manager/player framework in accordance with one embodiment of the disclosure. The engine manager/player framework (component H) may be a software application, such as a remote, plug-in supporting, software application, that provides the collective management of, and the interfaces to, the user's collection of vectoring engines, boxes and onboard service modules. The composition and structure of component Ii varies to match the interfacing needs of the user's vectoring engines, boxes, onboard service modules, calendar, the user abstract, and other items that may come to be added by the user. The manager/player framework (component H) interacts with the user virtualization framework component, the graphic user interface library, and the user's vectoring engines. Interactions with other components vary based on the composition of the engine manager/player component. In the case of manual activation of a vectoring engine, manual activation signaling is a function of the engine manager/player framework. The activation process triggers changes within the component and component G, which notifies the actualizer (component D) and in turn notifies the vectoring engine and attendant service modules of the state of readiness.

Figure 10:
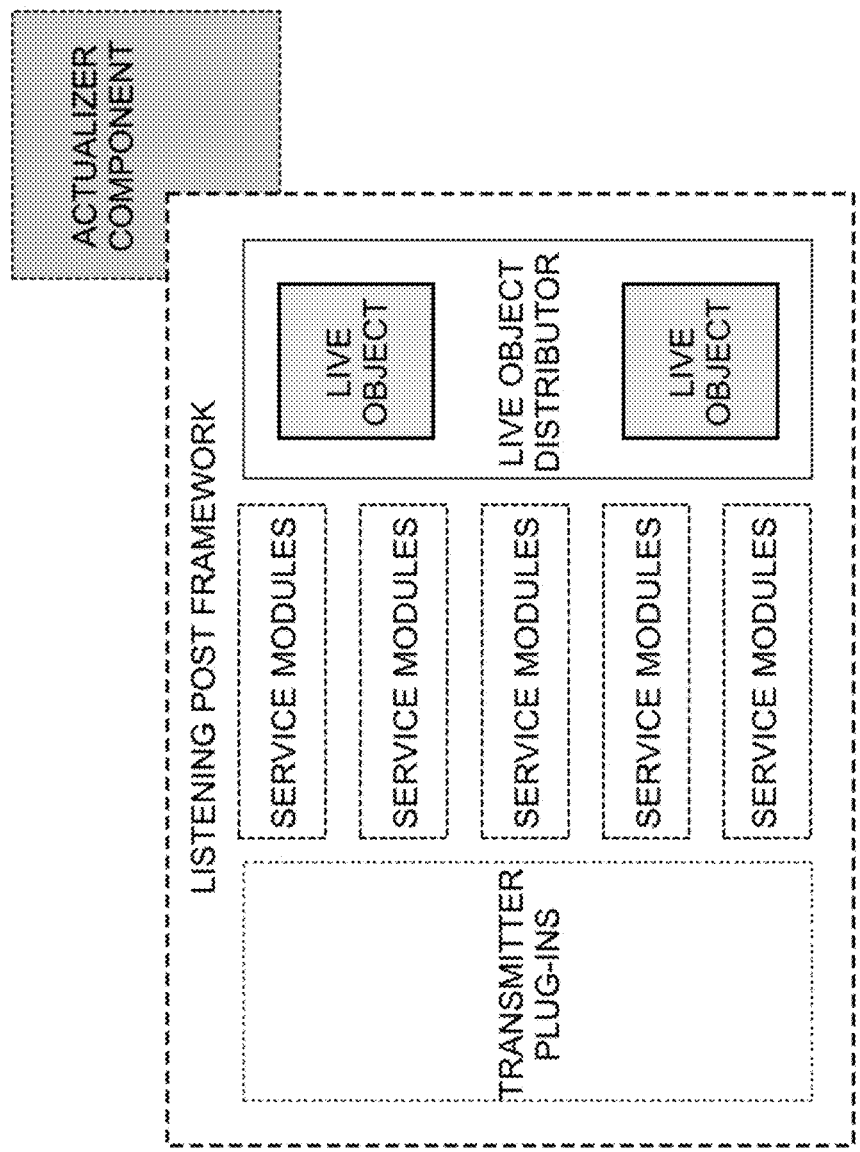
FIG. 10 discloses an exemplary listening post framework in accordance with one embodiment of the disclosure.

FIG. 10 is an exemplary listening post framework in accordance with one embodiment of the disclosure. The listening post framework (component I) may be software application, for example a hybrid (remote and local), plug-in supporting, application, that facilitates the capture, transmission, and integration of external performance altering data into the live objects. Often during the lifecycle of a personal endeavor, external factors emerge to have a bearing on the endeavor. This component provides the means to reconcile the performance of a vectoring engine with these factors. To do so, the Listening Post Framework operates in a manner similar to merger of the capture & transmit framework and the transmission processing framework. Distinguishing itself from these is the ability to communicate directly to the respective live object through the actualizer—having already been signaled by the actualizer of the instancing and activation of a respective vectoring engine.

Figure 11:
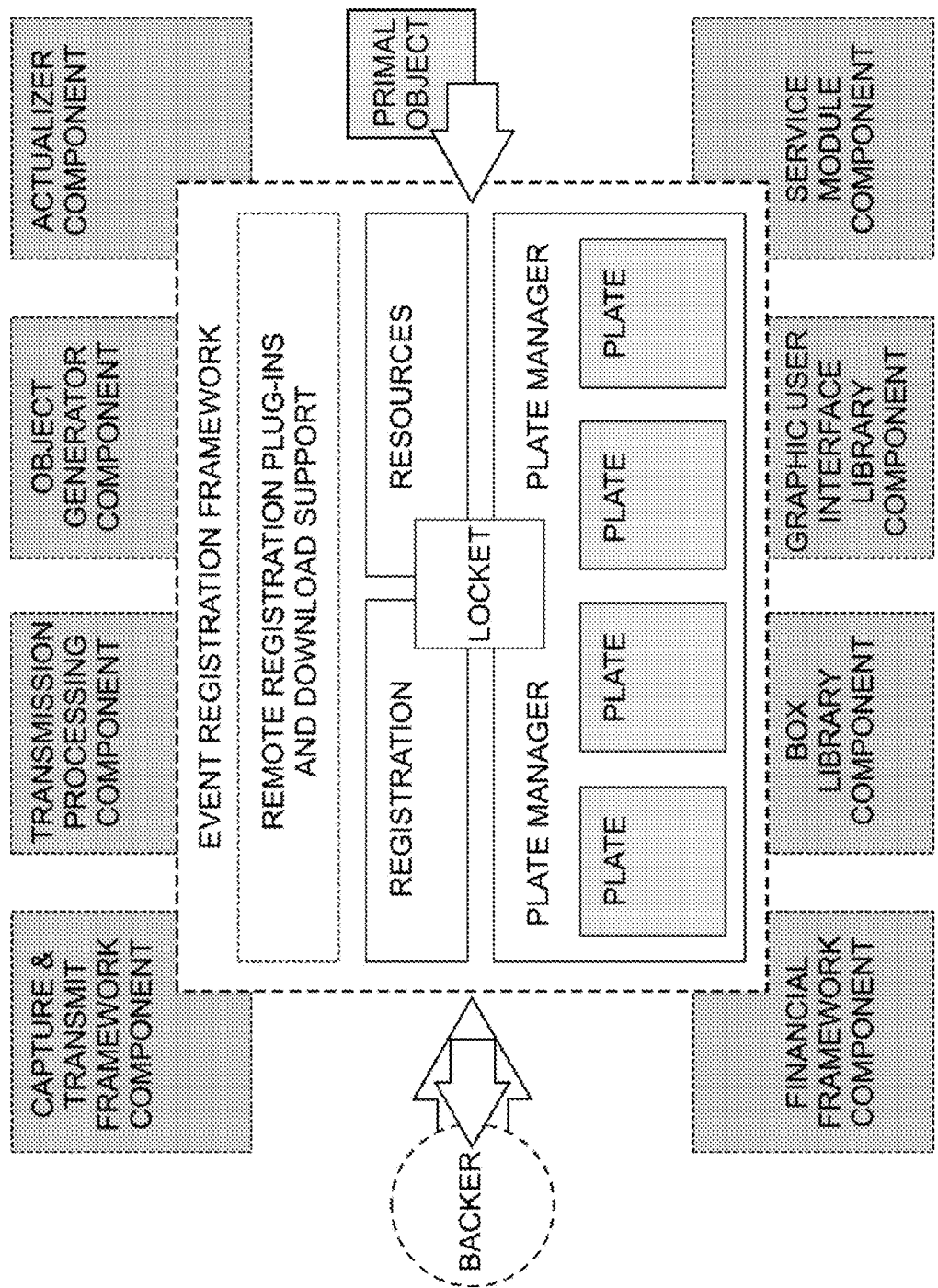
FIG. 11 discloses an exemplary event registration framework in accordance with one embodiment of the disclosure.

FIG. 11 is an exemplary event registration framework in accordance with one embodiment of the disclosure. The event registration framework (component J) may be a software application, for example a hybrid (remote and local), plug-in supporting, application, that provides a "backer." with the ability to have an event echoed by personalized instances of a vectoring engine. A "backer" is, for example, an individual who has engaged in the event registration process that is a prerequisite for the instancing of a vectoring engine that echoes the event that it's linked thereto. The framework enables the backer to specify the engine's performance and monitor and interact with each engine's user. The event registration framework captures and provides relevant data directly or indirectly to: the capture and transmit framework, transmission processing, object generator, actualizer, financial framework, box library, code library, graphic user interface library, and the service module library.

The event registration framework component includes, but is not limited, to registration processes, resource designations, locket creation, and plate creation. Similar to a keyframe used in graphics animation, plates include the "backer" defined instructions and resource designations fitting to a particular stage of support the vectoring engine is providing. During the respective stage, the plate defines the performance parameters of its associated vectoring engine. During the course of operation, it generates progress indicators that signal the vectoring engine when to activate a new or prior plate. Further a "backer" can modify a plate or create new plates at any time using software provided during the registration process. A Locket may be, for example, a local software container that that holds in one place the information generated during the registration process, including the backer authored plates. A primal object may be, for example, a software object that services as a generic representation of the actionable or acquirable element a vectoring engine is programmed to support. A primal object is used by "Box" to preface a related query.

Figure 12:
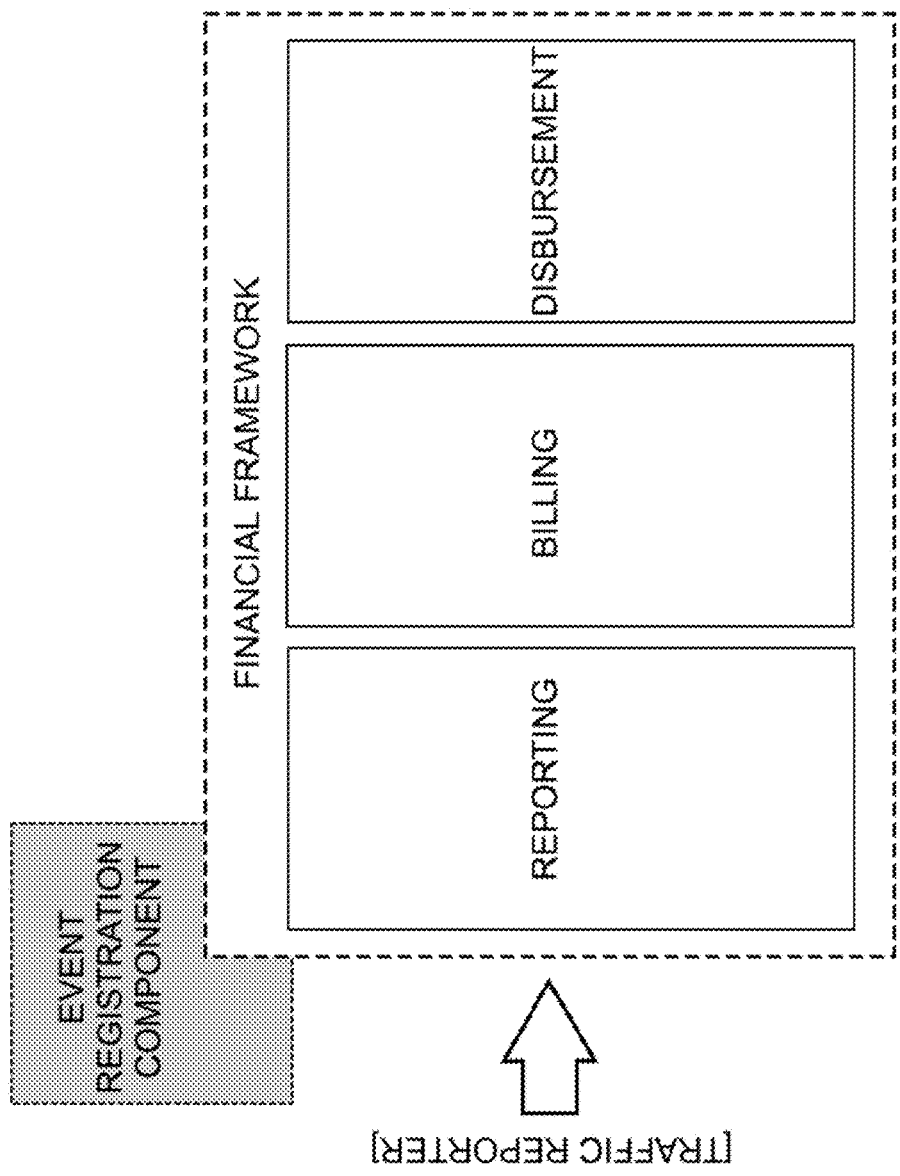
FIG. 12 discloses an exemplary financial framework in accordance with one embodiment of the disclosure.

FIG. 12 is an exemplary financial framework in accordance with one embodiment of the disclosure. The financial framework (component K) may be a software application, such as a local software application. The component is invoked in conjunction with deployments of the system where the need for a monetization component exists. In such case, the component receives information from the event registration component and from the traffic recorder component regarding and vectoring engine instancing and service module usage. These reports are used as the basis for billing a vectoring engine's backer and distributing the proceeds to the respective designated parties.

Figure 13:
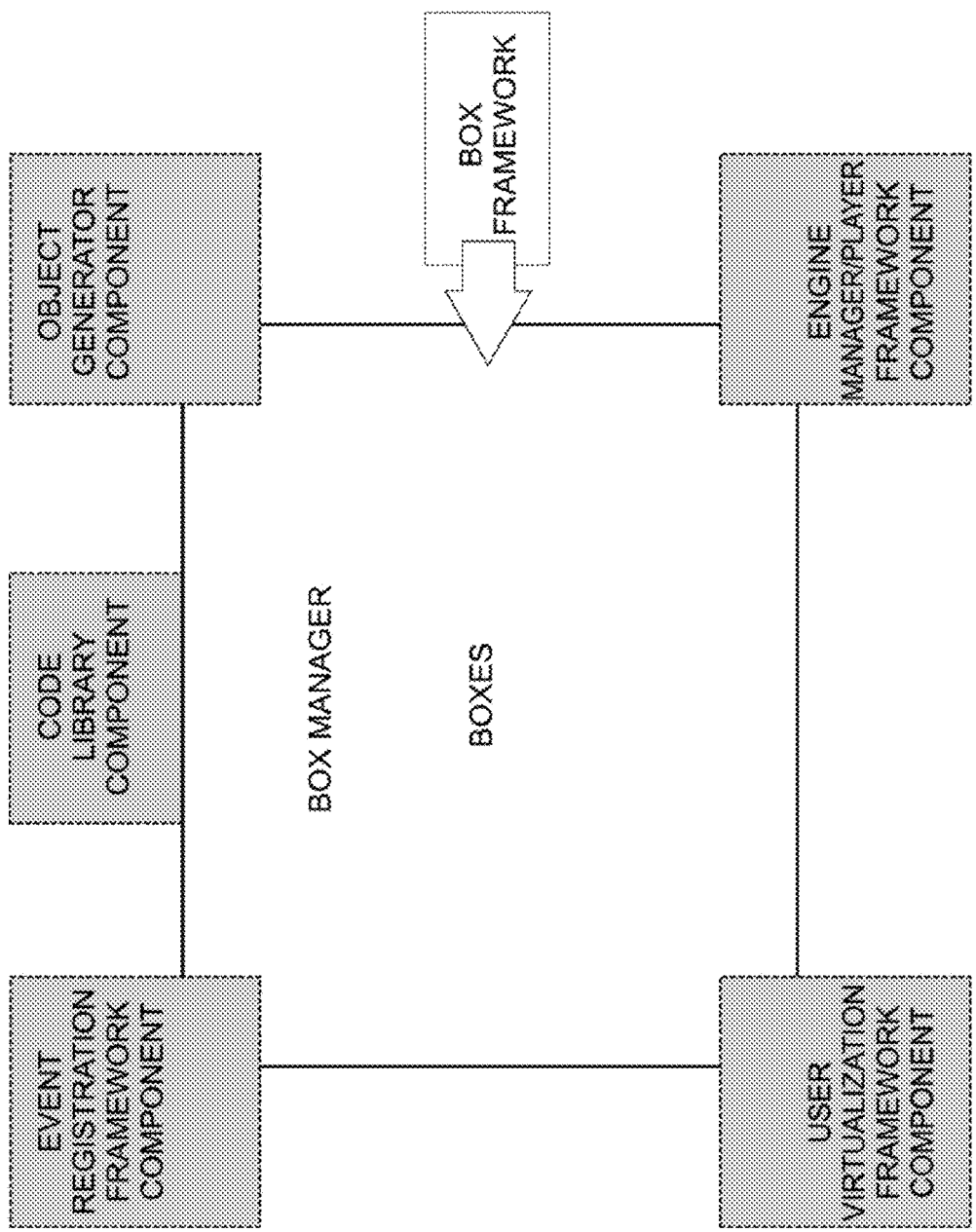
FIG. 13 discloses an exemplary box library in accordance with one embodiment of the disclosure.

FIG. 13 is an exemplary box library in accordance with an embodiment of the disclosure. The box library (component L) may be a software application, for example a local software application that includes and manages the system's boxes. A box may be, for example, a software application that is used to establish an independent relationship with the live object included in an engine or multiple engines. The product of the relationship is defined by the box. Further, a box can also include other boxes: with each "superior" box defining its own relationship and output. The contents of the box library are accessible and available to the event registration framework, object generator, user virtualization framework, and the engine manager/player framework. Further, its attendant codes are kept both internally and in the code library component, described below.

Figure 14:
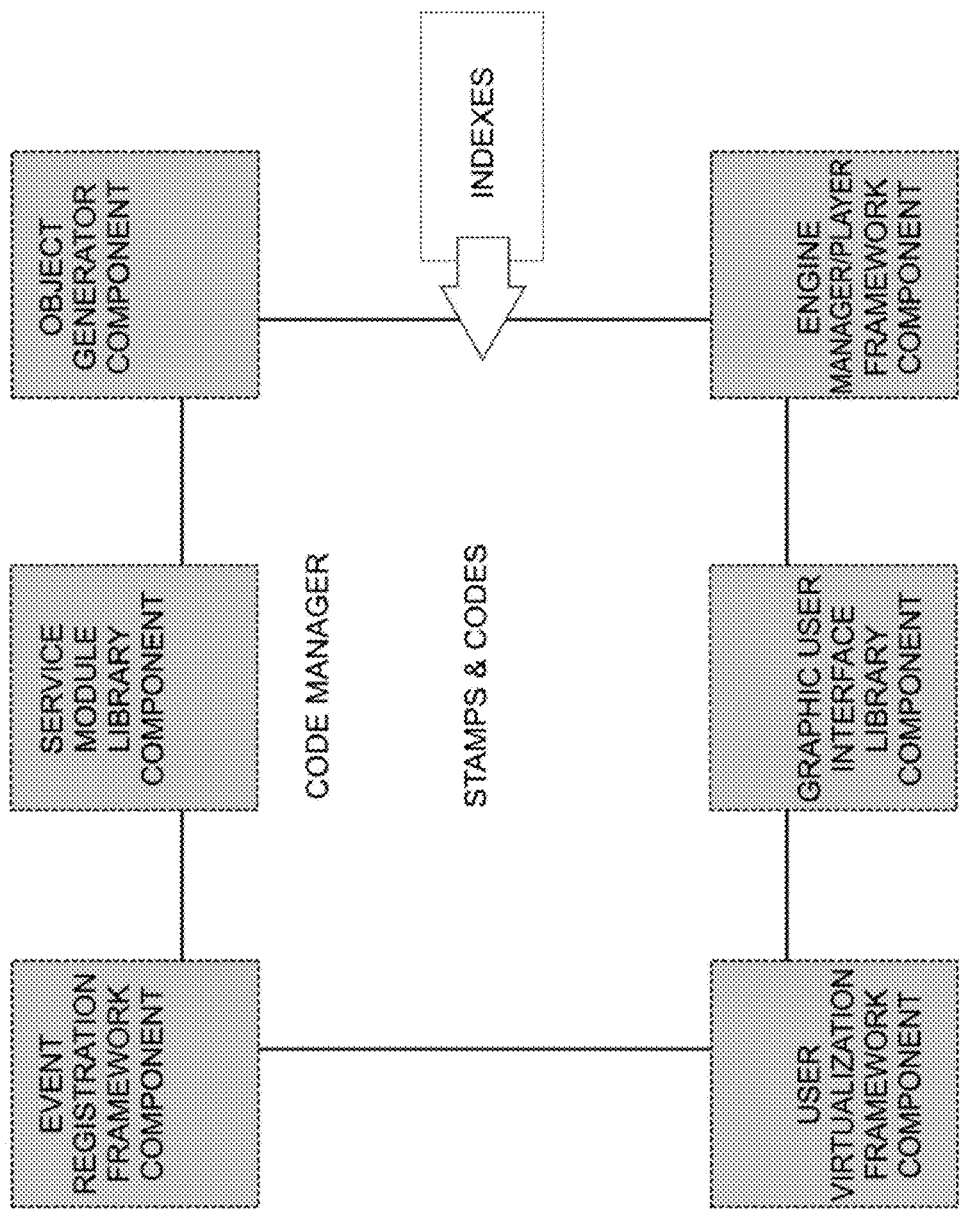
FIG. 14 discloses an exemplary code library in accordance with one embodiment of the disclosure.

FIG. 14 is an exemplary code library in accordance with one embodiment of the disclosure. The code library (component M) may be a software application, such as a local software application, that includes and manages the system's stamps, codes & indexes. Stamps, codes and indexes are numerical entries that the vectoring engine uses to communicate back and forth with codependent components. The contents of the code library are accessible and available to the event registration framework, object generator, user virtualization framework, and the engine manager/player framework, the graphic user interface library, service module library, and the box library.

Figure 15:
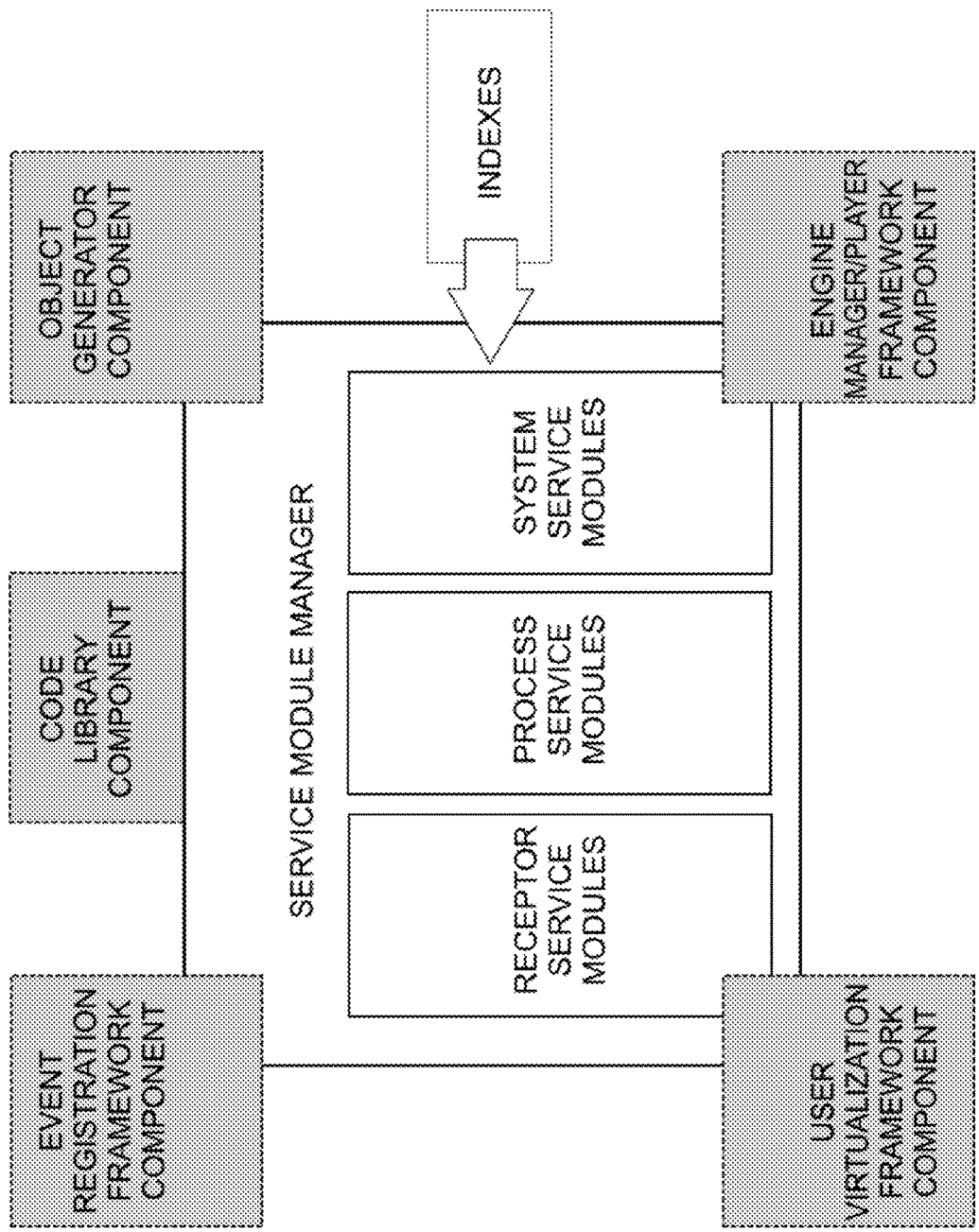
FIG. 15 discloses an exemplary service module library in accordance with one embodiment of the disclosure.

FIG. 15 is an exemplary service module library in accordance with one embodiment of the disclosure. The service module library (component N) may he a software application, such as a local software application, that includes and manages the system's service modules, defined below. The contents of the service module library are accessible and available to the following components: the event registration framework, transmission processing, object generator, and the engine manager/player framework. Further, its attendant codes are kept both internally and in the code library.

Figure 16:
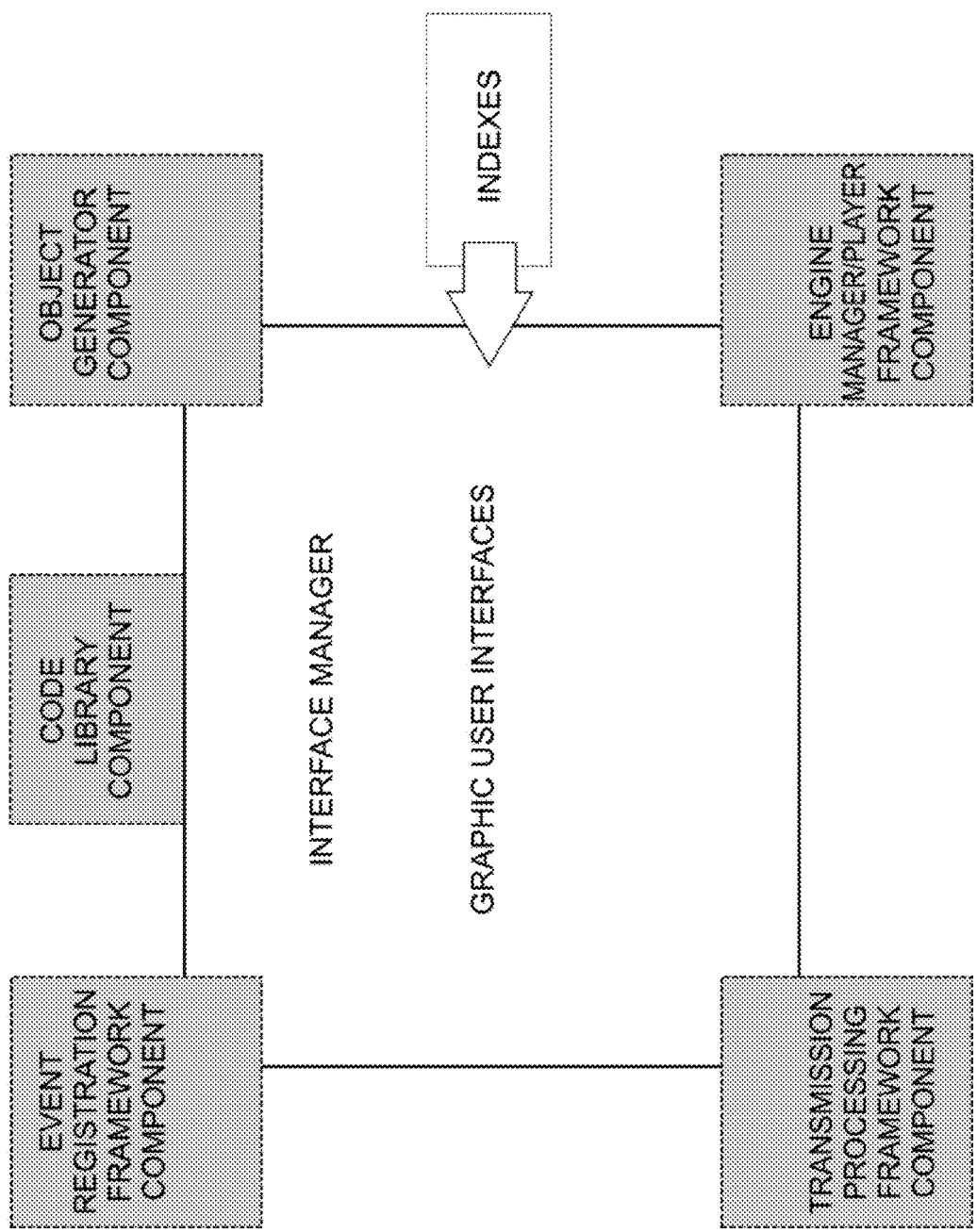
FIG. 16 discloses an exemplary graphic user interface library in accordance with one embodiment of the disclosure.

FIG. 16 is an exemplary graphic user interface library in accordance with an embodiment of the disclosure. The graphic user interface library (component O) may be a software application, such as a local software application, that includes and manages the system's graphic user interfaces. A graphic user interface may be, for example, the graphic user interface used to interact with a vectoring engine or box. An engine may elect to use any number of interfaces during the performance of its duties. The contents of the Service Module Library are accessible and available to the following components: the event registration framework, transmission processing, object generator, user virtualization framework, and the engine manager/player framework. Further, its attendant codes are kept both internally and in the code library.

Figure 17:
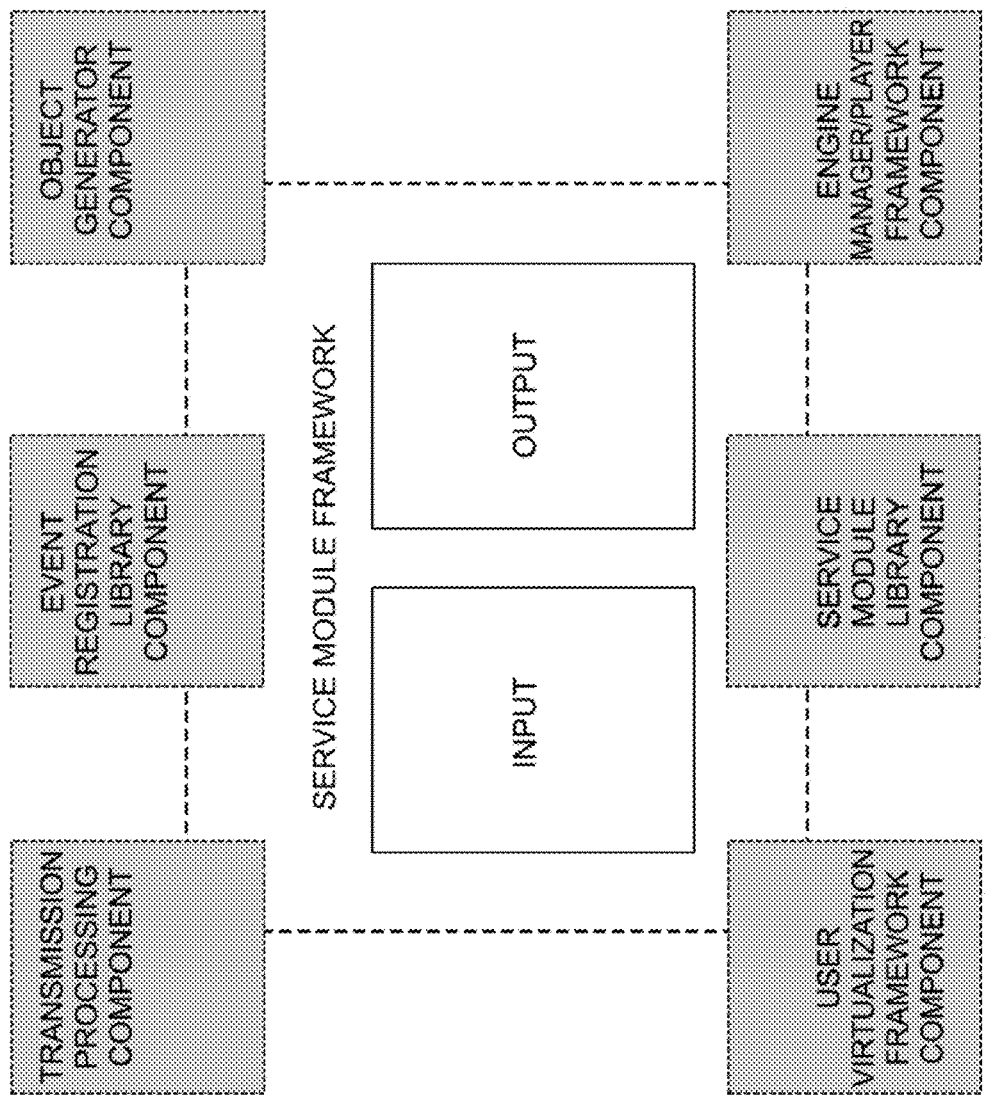
FIG. 17 discloses an exemplary service module framework in accordance with one embodiment of the disclosure.

FIG. 17 is an exemplary service module framework in accordance with one embodiment of the disclosure. The service module framework (component P) may be a software application, such as a local software application. In its performance, the framework works in concert with system-compliant plug-in service modules. A service module is a software application designed to perform a single task, such as send a text message or create a network among the people represented by vectoring engines within a user's collection. Within the designation there are three major classes: Receptor—which is used to receive and process incoming transmissions; Process—which works in conjunction with vectoring engines to manage external information and communication resources; and System—which are used throughout the system to support internal processes.

Regarding process service modules, the system is able to customize their otherwise generic performance by way of the timely insertion of codes, locators, identifiers, and other forms of metadata by the vectoring engine's controller. The modules also communicate the results of their efforts back to the controller so as to make it possible for the controller, in conjunction with instructions contained in the active plate, to assess progress and potentially signal the activation of a new active plate.

Figure 18:
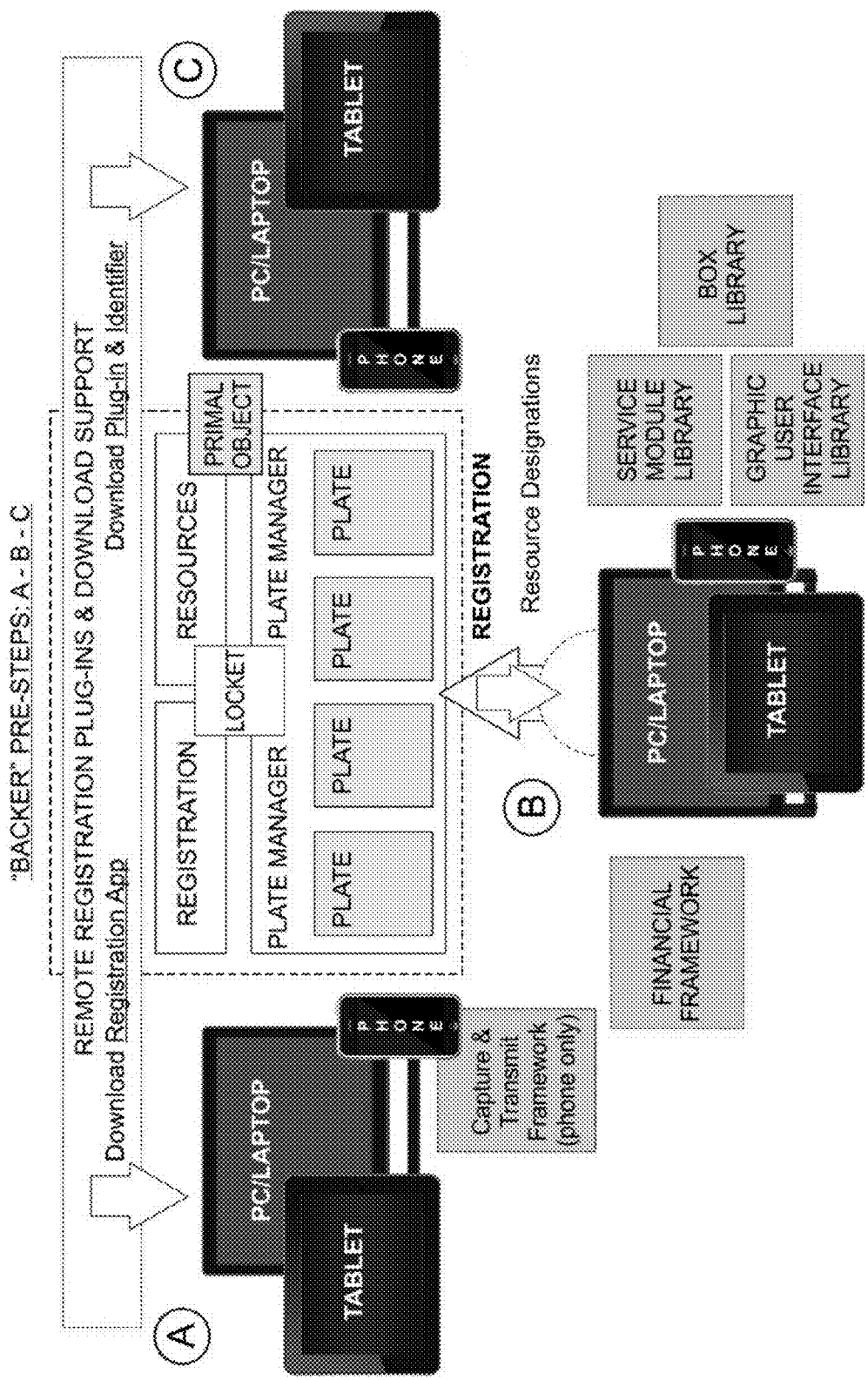
FIG. 18 discloses an exemplary process diagram in accordance with one embodiment of the disclosure.

FIG. 18 illustrates an exemplary process diagram in accordance with one embodiment of the disclosure. The diagram shows users, for example PC/laptop, tablet, phone, along with part of the event registration framework. The figure generally illustrates the procedures by which a backer of the system registers and sets-up. A "backer" is the individual (but not limited to an individual) who has engaged in the event registration process for the instancing of a vectoring engine. In order to create one or more "lines" of engines, the financial "backer" of the line(s) downloads an application that manages the system's registration process and consolidates the general management of the "backers" "lines" of engines. The term "line" is indicative of an event registration "Locket" from which similar vectoring engines are instanced. Separate registrations result in separate "lines" of vectoring engines (step A). (See. Component J: Event Registration Framework.) In step B, the system generates its resource vectoring engines ("Engine") using information obtained during the event registration process. (See, the Event Registration Component: Component J.) The event registration process can take place prior to the general engine generation process or concurrent therewith. During the course of this process, a locket is created to include pointers to backer designated resources. Component N (service module library) includes the software applications that serve both as a resource and processor of designated resources and Component O (graphic user interface library). Component L (box library) includes the software applications that serve as a resource to expand the usefulness of the system's Engines. The service modules, primal objects, plates, boxes, interfaces and component I (listening post framework). Each of these components and elements has a role in the event registration process, along with component K (financial framework), which manages (in conjunction with component F (traffic recorder)) the financial aspect of the registration, creation, and use of the system's engines. It is understood that the described embodiments are exemplary and not intended to limit the scope of the disclosure. For example, the registration process does not have to include each of the listed components and elements described above, but may include any variation of components and elements set forth in this disclosure. At the completion of the backer registration process, the backer is supplied with a plug-in that manages interactions with a backer's new "line" of vectoring engines, including altering their performance. A backer can modify a plate or create new plates at any time using software plug-ins. In addition, the backer is issued an identifier (a registration number, graphic, or other element) a user can capture and transmit using a capture and transmission plug-in installed on his or her mobile device (step C). The capture and transmit framework may also support the capture and transmission of the identifier by a third-party proxy.

Figure 19:
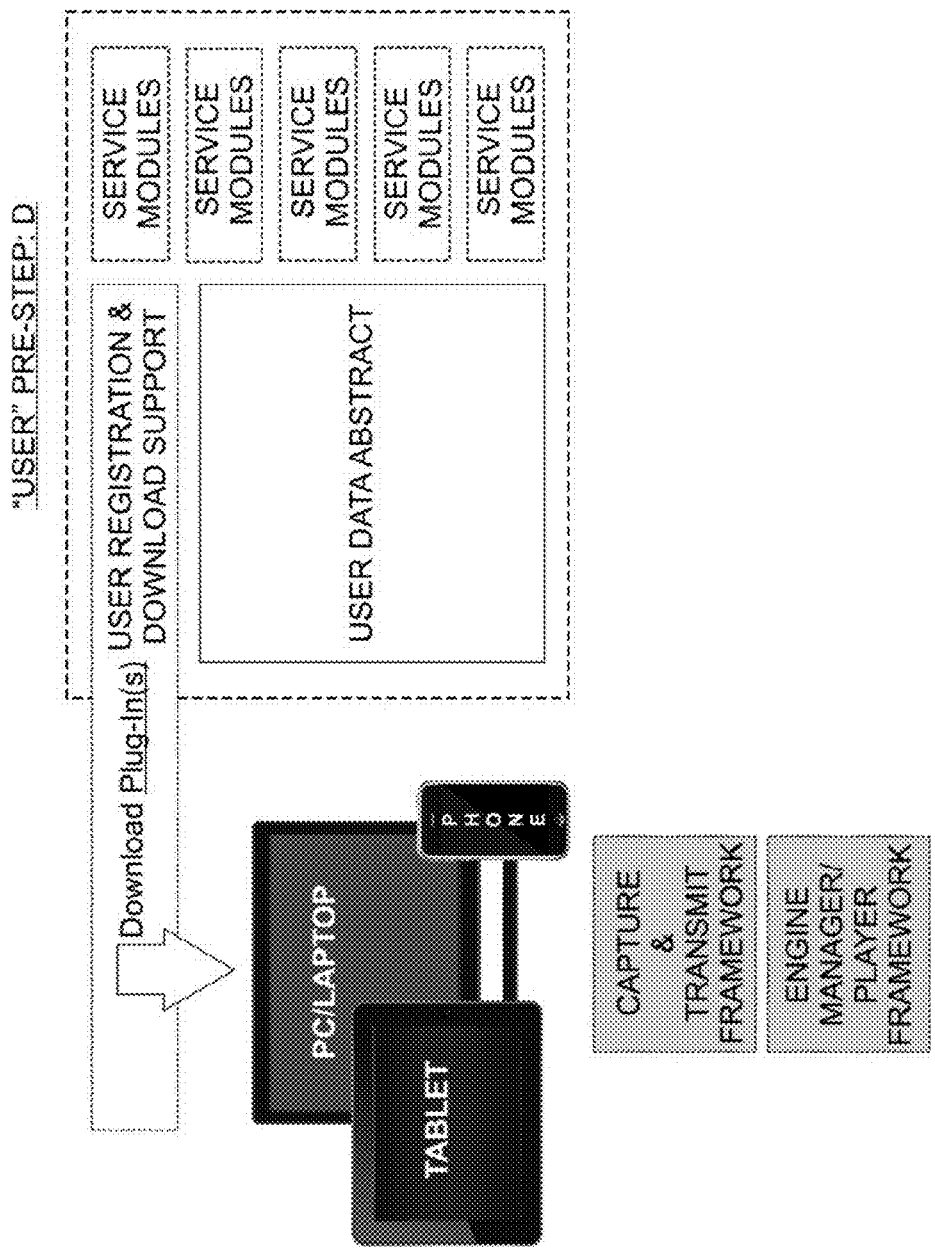
FIG. 19 discloses an exemplary process diagram in accordance with one embodiment of the disclosure.

FIG. 19 illustrates another exemplary process diagram in accordance with one embodiment of the disclosure. The figure generally illustrates the procedures by which a user registers and sets-up with the system. Users register and set-up on the system and download software-based extensions to component A (capture and transmit framework), and component H (engine manager/player framework) and optional plug-ins. Users may also access and/or download component G (user virtualization framework), which includes the user registration framework and download support.

Figure 20:
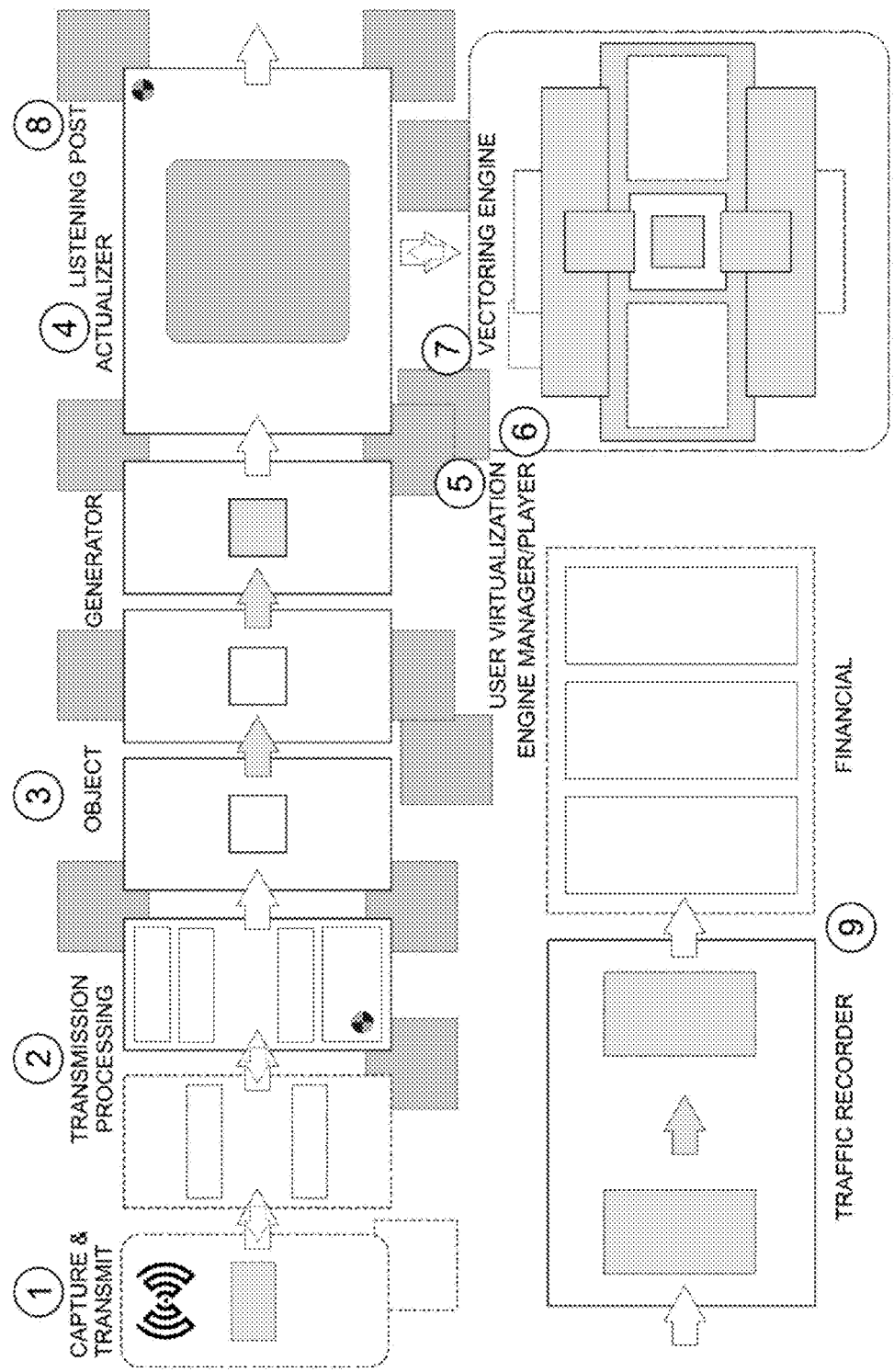
FIG. 20 discloses an exemplary process flow of the system in accordance with one embodiment of the disclosure.

FIG. 20 illustrates an exemplary process flow of the system in accordance with one embodiment of the disclosure. In step 1: using his mobile device, PC or any other device connected to the system, and the appropriate capture and transmit plug-in (component A) (or by proxy), a user captures and transmits the identifier to component B (transmission processing), which includes a respective receptor service module. Component B may also respond to the receipt of the transmission by returning to the user an additional interface by which to refine the transmission or for use in subsequent listening post related updates (see, component I: listening post framework.) If the identifier is incorrect, the transmission processing component will undertake an exchange with the user to rectify the incorrect entry.

In step 2: the system is designed to support a wide-range of identifier transmission modes (component B), such as keypad, barcode, voice, text, facial recognition, and GPS. Each of these modes has a respective receptor services module with a corresponding component A plug-in. Upon receipt of an identifier transmission, together with the respective receptor service module, the component undertakes a number of steps to validate the transmission, extract data and coded instructions, and insert stamps, system codes and locators; some of which are retrieved from the event registration component and the user virtualization framework component. Upon completion, the data, codes, and locators are aggregated and/or bundled ("bundle") and forwarded to component C (object generator).

In step 3, upon receipt of a bundle from component B, component C (object generator) creates a live object using the contents of the aggregation and/or bundle and data from the event registration component, the user virtualization framework component, the code library component, the box library component, and the graphic user interface component. Upon completion of the live object, it is forwarded to component D (actualizer).

In step 4, upon receipt of a live object from component C, component D (actualizer) uses coding contained in a live object to create a unique instance of a vectoring engine framework (component E). In this context, the term "actualize" means, but is not limited to, providing support for a continuously evolving state. To function in this capacity, the actualizer component gains support from the event registration framework component, the listening post framework component, the user framework component, and the traffic reporter component. Upon completion of a unique instance of a vectoring engine framework (component E), component D sends an access/activation link to the respective user virtualization framework (component G), the listening post framework (component I) and the traffic recorder (component F).

In step 5, upon receipt of the access/activation link, the user virtualization framework component (component G) posts the link for download to component H (engine manager/player framework).

In step 6, upon the user's activation of the engine manager/player framework (component H); component E (an instance of the vectoring engine) access/activation link is downloaded to the manager/player for activation. The activation process effects changes within the component and component G (user virtualization framework) and notices external components of its state of readiness. These include, for example, the actualizer and listening post components; which in turn notify their respective supporting service modules and components.

In step 7, upon activation, component H (the interface element) and component G (the transactional element) work together to support the use a respective engine.

In step 8, during the course of its use, the performance of a vectoring engine is subject to modification from input from component H (engine manager/player framework) user virtualization framework, component I (listening post framework), component J (event registration framework), the service modules, plates, boxes, and graphic user interfaces.

In optional step 9, using input from component F (traffic recorder) the financial framework supports billing, collection, and distribution of funds respective to the creation and user of a vectoring engine and use of a respective box.

The process flow described above creates and sustains a situationally-aware, proactive resource network to automate support for ongoing personal, collaborative, intersecting and contiguous endeavors in such fields as: education, buying & selling (retail and commercial), logistics, sports and entertainment, financial and commodity trades, social networking, medicine, emergency response, disaster relief, government and military operations, the maintenance of civil order, oil and natural gas production, environment and conservation, hospitality, advocacy, banking, and computer-modeled monetary systems.

Described herein below are non-limiting examples of the process flow identified above. Imagine a user passing through a small out of the way town and happen upon an intriguing restaurant. The food is fantastic, particularly the dessert. The wine is award winning and local. Certain that the user will forget the experience, he creates a vectoring engine. The user is happy because he found something he likes and want to keep the connection. The restaurant is equally happy because the engine will serve as a digital bond that's based on a good experience. When the user returns home, he downloads the engine's interface onto his mobile device or computer and the bond will begin to grow. For example, first the user may share it with friends. Next, he can access the link to the winery. Ordering a case of wine is simple because the engine knows which one you ordered at the restaurant. Next, the user asks the engine to send a text message when the user's GPS detects that he is in the vicinity of the restaurant again. A few weeks later, the user is hosting a dinner party, with the restaurant somewhat forgotten, and decides to use the search feature that manages his engines for suggestions. It's then that the user rediscovers the restaurant and remembers the dessert; so he uses the engine to ask the chef for the recipe. There's no need to describe it; the engine knows. The next day the user receives a copy of the recipe; along with it is an invitation to a special seating, including a discount coupon.

In the educational world, content may be created by the publishers and maintained in digital media. Any content provider can enable its content by creating a Locket for each textbook. Often important to both school district and content publisher alike, are dynamic, bi-directional channels. As a publisher updates and approves publishing of the content in a given textbook, that content is automatically pushed to each and every instance of a textbook's vectoring engine, thereby keeping the materials fresh. Also, course materials and augmented services may be offered in a variety of delivery options, for example, developing, basic and advanced. This gives both student and teacher true differentiated learning across every course.

An example of such content, publication and vectoring engine for use in the system is illustrated below. Over the summer, Ms. Brown, a fourth grade teacher, attended conferences offered by a Third-Party Education Licensee. Covered in that conference were the details about the system's platform, how/when to use it, best practices, features, etc. Features chosen by the school district provide a means for the students collaborate amongst themselves in a secure, monitored environment, but, in addition to her regular school hours, Ms. Brown would be available online Monday and Thursdays from 6 PM to 7 PM where she can interact with students via an online video classroom. Students can ask questions and see and hear Ms. Brown explain the answers to unit study issues. Students unable to make the live session, or wish to replay the session for clarity, could watch the archived version sometime later as they have time.

At the beginning of the school year, the school district is signed up to provide instances of Vectoring Engines to every teacher and student. As part of that process, teachers and students are assigned accounts. Within the first couple weeks of school, students are evaluated for proficiency in math. They are grouped into one of three categories, for example: developing, basic and advanced. Through her client application, Ms. Brown imports her class roster and assigns each student to one of the three differentiated learning categories above matched to the student's account. While the basic and advanced students might excel when a particular teaching method is used. the students in the developing group might benefit from alternate method(s) of instruction. Using her application, Ms. Brown can ensure that each student receives instruction based on content and teaching methods developed by the publisher which are tailored to the abilities and needs of each group. Ms. Brown introduces the concepts of long division. She goes over examples, and assigns homework from an enabled textbook (course of instruction). Instead of each student writing down the homework, Ms. Brown, for example in a drag-and-drop environment, assigns homework to each child based on his or her level of proficiency in to the "backer" app interface.

At home, the children access the related Vectoring Engine and engage that night's homework. The homework is developed by the content publisher and is based on the lesson Ms. Brown taught that day, so an answer key is integrated with that section's vectoring engines active plate. The homework is instantly graded and both the fact that a student completed the homework and the resulting grade are automatically recorded in Ms. Brown's online grade-book. Further, let's say a student named Billy gets numbers four and seven wrong. Upon grading the work, the vectoring engine tells Billy he got two wrong, and presents him with a couple of videos and lessons which reteach the concepts he hadn't completely mastered. If desired, he can watch the videos and do a few more problems, the results of which can be sent automatically to Ms. Brown.

For her part, as she prepares for the next day (either later that night or early the next morning using the "backer" app interface), Ms. Brown can quickly and easily see which students did what, and, importantly, maximize her valuable time by quickly and easily seeing how each student did on the prior night's work. Within a few minutes she can prioritize her for time the next day. Accordingly, the system is facilitating the delivery of personalized and differentiated learning, ensuring that each student is taught in a way that maximizes both dollars and time spent. This allows private, secure interaction between the student and instructor, and allows private network platforms for interactions for teacher to teacher, principle to principle, and superintendent to superintendent with a goal for each to develop and share "best practices."

Other examples include the utilization of expositions. World-wide there are 10,000 expositions each year, plus countless seminars, workshops, conferences and symposiums. The system may be utilized in the exposition as follows. Assume in one example that there is a manufacturer or distributor of golf clubs. The manufacturer or distributor attends a PGA merchandise show, and brings 10 new drivers that are sold as part of the inventory. As do all exhibitors, a booth is set up, complete with monitors for running looped videos highlighting my products, as well as product literature and samples. A couple of representatives man the booth. The show starts and the booth garners a lot of traffic—far more than the booth representatives can efficiently handle. While fostering and developing relationships with every attendee who walks into the booth would be preferred, it is beyond the capabilities of the few people maiming the booth. However, as part of the registration process to be an exhibitor, the manufacturer/distributor signed up to have the products and content undergo the event registration process.

The registration process makes it possible to quickly and easily organize the content and information about the products in the booth for attendees into attendee-specific instances of vectoring engines. Now, if representatives are occupied with other attendees when attendee "Bill" walks into the booth, the system can handle it. Bill's interested in a specific driver, and, in addition to that product's literature. Bill simply enters the booth number into a software plug-in on his or her phone, along with the driver and other items of interest that are registered. The resulting instance of a vectoring engine is posted to the user's virtualization component for download onto a user's device. Bill clicks on some of the content included in the vectoring engines interface: 3D views of the driver, videos about manufacturing and tour player testimonials, etc. Bill's interested, but the price is too steep for him today. As Bill closes the interface, he is presented with a question: why didn't you buy the driver today? Radio buttons have been included for him to explain his reason(s) why. One of those is "Cost too high". As an immediate follow-up, the vectoring engine asks Bill if he'd be buying it today if it meant a 10%/15% discount. If Bill clicks yes, for example, then the vectoring engine immediately takes him to the configuration interface, then from there to the order confirmation and shipping interface. Since the date the show ends is known, shipping is automatically configured so it arrives on or before he gets home. If Bill answers no again, he can be prompted for the price point at which he'd be interested in buying. When Bill leaves the show he still has the Vectoring Engine for that driver. That vectoring engine, via a service module and user and "backer" interfaces can create a bi-directional channel between Bill and the manufacturer/distributor company. So, for example, if the manufacturer/distributor has chosen to interface a product database with the vectoring engine, and at some point down the road the price is dropped on the driver Bill wants at the price point he indicated, both Bill and a representatives could be alerted that Bill can get the driver at the price he wants. Through the same vectoring engine, Bill can proceed with the configuration and order confirmation and shipping.

The system described above offers numerous advantages, including work as hidden layers, parent/child dependencies, and other permutations Other advantages include exacting, personalized match of resources to the situation at hand; ongoing matching of resources to current needs (performance shifting); instant onsite availability: cloning to all of a user's devices; instantly sharable with other parties; self-synchronization on the user's and other parties devices; operation in conjunction with a transactional revenue component; work in unison with other vector engines.

The vectoring engines of the disclosure may be differentiated from mobile Apps in the following non-limiting ways:

A. Apart from a phone's operating system mobile apps do not run inside a comprehensive environment. Vectoring engines run inside a comprehensive operating environment.

B. Mobile apps do not operate in the capacity of an engine using a live (read/write) object and surrounding controller to orchestrate the timely application of specialized (algorithmic) services modules; with the live object supplying the instructions governing their performance. Vectoring engines, on the other hand, do operate in the capacity of an engine, using a live (read/write) object and surrounding controller to orchestrate the timely application of specialized (algorithmic) services modules: with the object supplying the instructions governing their performance.

C. The coded instructions governing the performance of mobile apps are not a derivative of datasets supplied by the parties to an activity. The coded instructions governing the performance of vectoring engines are a derivative of datasets supplied by the parties to an activity.

D. Mobile apps are not designed to support an activity representing the progressive execution of a complex scenario having the potential for variations from the standard model script. Vectoring engines are designed to support an activity representing the progressive execution of a complex scenario having the potential for variations from the standard model script.

E. Mobile apps provide their own graphic user interfaces. Vectoring engines typically do not, but rather support interactions via library-based graphic user interfaces.
F. A user's mobile apps do not communicate with each other. Vectoring engines have the ability to communicate with each other, including each other's performance. Vectoring engines also have the ability to communicate with compliant mobile apps.
G. Mobile apps are not created on-demand to support a user-specific personal activity. Vectoring engines are created on-demand to support a user-specific personal activity.
H. Mobile apps are not designed to support a user-specific personal activity from onset through to its completion.
I. Mobile apps cannot be created on-demand to capture an event or happening that the user is in the midst of or passing by; including its participants. Vectoring engines can be created on-demand to capture an event or happening a user is in the midst of or passing by; including its participants.
J. Mobile apps cannot alter their performance in response to variations in the user's approach to the activity. Vectoring engines can and do alter their performance based on variations in the user's activities.
K. Mobile apps cannot alter their performance, in regard to a user-specific activity based on external signaling transmissions. Vectoring engines can and do alter their performance based on external signaling transmissions.
L. The performance of mobile apps is not influenced by a comprehensive profile of its user; including outcome or current state of other activities. The performance of a vectoring engine is influenced by a comprehensive profile of its user; including the outcome or current state of other activities.
M. Mobile apps do not spontaneously, or otherwise, spawn another mobile app. Vectoring engines can spawn another vectoring engines having different functionality.
N. Mobile apps cannot be cloned and sent to another user or users. Vector engines can be cloned and sent to another user or users.
O. Mobile apps cannot be cloned and sent to other users to create nodes on a neural network. Vectoring engines can be cloned and sent to others (including devices and machines) to establish a neural network.
P. Mobile apps are not capable of defining and managing the responsibilities and resources available to the parties (including machines) that are represented as nodes on a neural network.
Q. Mobile apps are not capable of defining and managing the responsibilities and resources available to the parties (including machines) that are represented as nodes on a neural network. In addition, the vectoring engine can keep a record of the responsibilities and resources available to each node and their state—relative to the greater activity and portion assigned to the node, including providing updated reports to a monitoring agent.
R. Mobile apps are not designed to echo a specific object and, like a baton, pass from one user to another to signify the transfer and possession of the object. Vectoring engines can echo a specific object and, like a baton, pass from one user to another to signify the transfer and possession of the object. In addition, the vectoring engine can keep a record of the transfers and possessors, including providing updated reports to a monitoring agent.
S. The performance of mobile apps is not directly driven by videogame-like nonlinear storyboards; which allow for deviations from the norm. The performance of a vectoring engine is driven by videogame-like nonlinear storyboard; which allows for deviations from the norm. In addition, sensitive to "subsequent" transmissions a vectoring engine can operate without a graphic user interface to trigger automated responses by its (algorithmic) service modules.
T. A collection of mobile apps cannot be searched for the keywords and dates they contain. A collection of vectoring engines can be searched for the keywords and dates they contain.
U. Mobile apps cannot be made responsive to a personal calendar or a group calendar or operate inside a unified messaging schema and app management environment. Vectoring engines are responsive to personal and group calendars and designed to operate inside a unified messaging schema and app management environment.
V. Mobile apps are not designed to operate in parent/child dependency relationship. Vectoring engines are designed to operate in parent/child dependency relationships.
W. Mobile apps are not designed to create a secure information space. Vectoring engines by their very nature create a secure information and communications space between the parties that is unique to each instance of a vectoring engine. In addition, the system utilizes an "alternate path" response methodology.
X. Mobile apps are not designed to create situation-sensitive communication and information sharing networks between the parties (including machines).
Y. Mobile apps are not designed to be "framed" by other software applications that tap their workings to perform sympathetic functions; some of which may add another layer of functionality to the mobile app and/or create another mobile app that uses the output of the "frame" to perform a function that's sympathetic to the frame that its linked to and is also capable of being "framed" by another software application. Vectoring engines, singularly or in groups, are designed to be "framed" by other software applications that tap their workings to perform sympathetic functions; some of which may add another layer of functionality to the vectoring engine(s) and/or create another vectoring engine that uses the output of the "frame" to perform a function that's sympathetic to the frame that its linked to and is also capable of being "framed" by another software application.
Z. Mobile apps are not designed to be driven by library-based numerical codes, stamps, and indexes. Vectoring engines are designed to be driven by library-based numerical stamps, codes, and indexes.

The vectoring engines of the disclosure may be differentiated from the Web in the following non-limiting ways: (In broad terms, the Web is an information sharing system and the disclosure is directed to an activity support system.)

A. The core information supporting instrument of the Web is a website consisting of one or more pages. The activity supporting instrument in the system is a resource vectoring engine.
B. The Web is a hypertext web-like environment, the system is a mission-oriented hub and spoke computing environment.
C. The Web relies on the use of a browser. The system does not rely on a browser.

D. While Coordinated Universal Time (UTC) has some relevance to the Web, it is inseparable from almost every operation within the system.
E. The Web is a passive system that relies heavily on the Internet's Hypertext Transfer Protocol. The system is a proactive system that relies on distributed computing and metadata, and event signaling.
F. The Web is not reliant on mobile devices. Mobile devices are integral to the operation of the system.
G. Search engines are integral to the Web. Web-style search engines are not part of the systems schema, although may be incorporated therein.
H. The Web is not designed to protect its users' identity and the sanctity of their communications. The system is designed to protect its users' identity (privacy) and the sanctity of their communications. In addition, the system utilizes an "alternate path" response methodology.
I. The Web does not include a uniform monetization platform. The system includes an optional a transactional, uniform monetization platform.
J. The Web does not include a uniform financial clearing port necessary to provide comprehensive support for the buying and selling of goods and services. The system includes a uniform financial clearing port to provide comprehensive support for the buying and selling of goods and services.
K. The Web does not know why someone is using it. The system knows precisely why an individual is using it.
L. The Web does not require or support user registration. The system allows user registration, but does not require that its users disclose their identity.
M. The Web has a "one-size-fits-all" architecture. The system supports intermediary platforms that customize the architecture within categories of usage. In addition, it can support regulated communications between the intermediary platforms.

Accordingly, the present disclosure provides various systems. servers. methods, media, and programs. Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system for managing computer network resources, comprising: one or more processors that include: a computer-readable storage medium that stores operational programs and related data; a receiver that receives data acquired from an external device over a communication network; a transmitter to process the data acquired from the external device, an object generator to compile the data acquired from the transmitter into a live object, an actualizer to link the resources identified in the live object via service modules and interfaces and to activate the links of the identified resources to acquire information from the resources and to personalize performance of the resources; a vectoring engine that is created by the one or more processors to implement specific objectives of the live object and an active plate, and to manage the service modules and interfaces of the system to execute the specific objectives; and a transmitter to transmit results of the executed specific objectives over the network to the external device.

2. The system in accordance with claim 1, wherein the transmission element:
    validates the data acquired from the external source;
    extracts at least a portion of the data and inserts identifiers, system codes and indexes; and
    aggregates the at least a portion of the data, the system codes and the indexes and forwards the aggregated information to the object generator.

3. The system in accordance with claim 1, wherein the object generator:
    assembles the aggregated data acquired from the transmission element by:
        scanning the aggregated data for embedded algorithms,
        inserting additional identifiers, system codes and indexes received from at least one of user and event registration data, and
        formatting the aggregated data based on the embedded algorithms;
    codes the aggregated data by inserting header codes and indexes received from library sources; and
    creates the live object and the active plate from the aggregated data.

4. The system in accordance with claim 1, wherein the actualizer:
    provides an instance of a vectoring engine using data in the live object to provide support in a continuously evolving manner,
    activates the link to acquire information from the resources and to personalize performance of the resources, and
    interfaces the instance with internal and external resources.

5. The system in accordance with claim 1,
    wherein the vectoring engine implements the specific objectives using:
    the active plate and a reserved plate defining instructions and resource designations corresponding to a stage of implementation;
    user data providing a user data profile to personalize performance of the system;
    user resources designating the resources enabled on a user or system device;
    a communications manager interfacing active system components; and
    a controller extracting and posting the codes included in the live object for use by the active system components,
    wherein the vectoring engine executes the instructions and resource designations included in the live object and the active plate.

6. The system in accordance with claim 5,
    wherein the active plate and the live object include updatable code-based instructions that govern performance of an instance of the vectoring engine.

7. The system in accordance with claim 6,
    wherein the instance of the vectoring engine coordinates performance of available system resources in furtherance of the specific objectives.

8. The system in accordance with claim 1,
    wherein the service modules are dynamically managed in an evolving manner.

9. The system in accordance with claim 1, wherein the external device is at least one of a mobile and network device, including plug-ins, to capture and transmit markers the system uses to initiate management of system resources.

10. The system in accordance with claim 1, wherein the external device is a listening post to facilitate the capture, transmission and integration of external performance altering data into the live objects by way of the actualizer.

11. The system in accordance with claim 5,
    wherein the user data profile includes at least at least one of the user's language, mobile number(s), time zone, device ID's, use history, calendar, personal codes, personal networks, active boxes, active interfaces, vectoring engines, and onboard service modules.

12. A computer-implemented method of managing computer network resources by one or more processors, the method comprising: receiving data, by a receiver, acquired from an external device over a communication network; storing operational programs and related data in a computer-readable storage medium; processing, by the one or more processors, data acquired from the external device; compiling, by the one or more processors, the data acquired from the external device into a live object; linking, by the one or more processors, resources identified in the live object via service modules and interfaces and activating the links of the identified resources to acquire information from the resources and to personalize performance of the resources; creating, by the one or more processors, a vectoring engine to implement specific objectives of the live object and an active plate: and to manage the service modules and interfaces of the system to execute the specific objectives; and transmitting results of the executed specific objectives over the network to the external device.

13. The method in accordance with claim 12, wherein the processing further comprises:
   validating the data acquired from the external source;
   extracting at least a portion of the data and inserting identifiers, system codes and indexes; and
   aggregating the at least a portion of the data, the system codes and the indexes and forwarding the aggregated information for compiling.

14. The method in accordance with claim 12, wherein the compiling further comprises:
   assembling the aggregated data acquired from the processing by:
      scanning the aggregated data for embedded algorithms, inserting additional identifiers, system codes and indexes received from at least one of user and event registration data sources, and
      formatting the aggregated data based on the embedded algorithms;
   coding the aggregated data by inserting header codes and indexes received from library sources; and
   creating and populating the live object from the aggregated data.

15. The method in accordance with claim 12, wherein the linking further comprises:
   providing an instance of the implementing using data in the live object to provide support in a continuously evolving manner,
   activating the link to acquire information from the resources and to personalize performance of the resources, and
   interfacing the instance with internal and external resources.

16. The method in accordance with claim 12, wherein the implementing further comprises:
   providing the active plate and a reserved plate defining instructions and resource designations corresponding to a stage of implementation;
   providing user data having a user data profile to personalize performance of the system;
   providing user resources designating the resources enabled on a user or system device;
   interfacing active system components; and
   extracting and posting the codes included in the live object for use by the active system components;
   executing the instructions and resource designations included in the live object and the active plate.

17. The method in accordance with claim 16,
   wherein the live object and the active plate include updatable code-based instructions to governing performance of an instance of the implementing.

18. The method in accordance with claim 17,
   wherein the vectoring engine coordinates performance of available system resources in furtherance of the specific objectives.

19. The method in accordance with claim 12, wherein the service modules are dynamically managed in an evolving manner.

20. The system in accordance with claim 12, wherein the external device captures and transmits markers to initiate management of system resources.

21. The system in accordance with claim 12, wherein the external device facilitates the capture, transmission and integration of external performance altering data into the live objects.

22. The method in accordance with claim 16,
   wherein the user data profile includes at least at least one of the user's language, mobile number(s), time zone, device ID's, use history, calendar, personal codes, personal networks, active boxes, active interfaces, vectoring engines, and onboard service modules.

23. A computer readable storage device that stores a set of instructions for managing computer network resources, the instructions when executed causing one or more processors to perform operations comprising: receiving data, by a receiver, acquired from an external device over a communication channel; storing operational programs and related data in a memory; processing, by the one or more processors, data acquired from the external device; compiling, by the one or more processors, the data acquired from the external device into a live object; linking, by the one or more processors, resources identified in the live object via service modules and interfaces and activating the links of the identified resources to acquire information from the resources and to personalize performance of the resources; creating, by the one or more processors, a vectoring engine to implement specific objectives of the live object and an active plate, and to manage the service modules and interfaces of the system to execute the specific objectives; and transmitting results of the executed specific objectives over the network to the external device.

24. The computer readable storage device in accordance with claim 23, wherein the processing further comprises:
   validating the data acquired from the external source;
   extracting at least a portion of the data and inserting identifiers, system codes and indexes; and
   aggregating the at least a portion of the data, the system codes and the indexes and forwarding the aggregated information for compiling.

25. The computer readable storage device in accordance with claim 23, wherein the compiling further comprises:
   assembling the aggregated data acquired from the processing by:
      scanning the aggregated data for embedded algorithms, inserting additional identifiers, system codes and indexes received from at least one of user and event registration data, and
      formatting the aggregated data based on the embedded algorithms;
   coding the aggregated data by inserting header codes and indexes received from library sources; and
   creating and populating the live object from the aggregated data.

26. The computer readable storage device in accordance with claim 23, wherein the linking further comprises:
   providing an instance of the implementing using data in the live object to provide support in a continuously evolving manner,
   activating the link to acquire information from the resources and to personalize performance of the resources, and
   interfacing the instance with internal and external resources.

27. The computer readable storage device in accordance with claim 23, wherein implementing specific objectives comprises:
   providing the active plate and a reserved plate defining instructions and resource designations corresponding to a stage of implementation;
   providing user data having a user data profile to personalize performance of the system;
   providing user resources designating the resources enabled on a user or system device;
   interfacing active system components; and extracting and posting the codes included in the live object for use by the active system components, executing the instructions and resource designations included in the live object and the active plate.

28. The computer readable storage device in accordance with claim 27, wherein the live object and the active plate include updatable code-based instructions that govern performance.

29. The computer readable storage device in accordance with claim 28, wherein the vectoring engine coordinates performance of available system resources in furtherance of the specific objectives.

30. The computer readable storage device in accordance with claim 23, wherein the service modules are dynamically managed in an evolving manner.

31. The computer readable storage device in accordance with claim 23, wherein the external device captures and transmits markers to initiate management of network resources.

32. The computer readable storage device in accordance with claim 23, wherein the external device facilitates the capture, transmission and integration of external performance altering data into the live objects.

33. The computer readable storage device in accordance with claim 27, wherein the user data profile includes at least at least one of the user's language, mobile number(s), time zone, device ID's, use history, calendar, personal codes, personal networks, active boxes, active interfaces, vectoring engines, and onboard service modules.

* * * * *